(12) United States Patent
Han et al.

(10) Patent No.: US 12,487,634 B2
(45) Date of Patent: Dec. 2, 2025

(54) DISPLAY DEVICE

(71) Applicant: SAMSUNG DISPLAY CO., LTD., Yongin-si (KR)

(72) Inventors: So Yeon Han, Yongin-si (KR); Hee Young Lee, Yongin-si (KR); Da Som Gu, Yongin-si (KR); Ki Jun Roh, Yongin-si (KR); Gil Yeong Park, Yongin-si (KR); Sung Guk An, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 341 days.

(21) Appl. No.: 18/296,070

(22) Filed: Apr. 5, 2023

(65) Prior Publication Data

US 2024/0085948 A1     Mar. 14, 2024

(30) Foreign Application Priority Data

Sep. 1, 2022 (KR) .................. 10-2022-0110726

(51) Int. Cl.
*G06F 1/16* (2006.01)
*G02B 5/30* (2006.01)
*H04M 1/02* (2006.01)
*H10K 59/80* (2023.01)
*H10K 102/00* (2023.01)

(52) U.S. Cl.
CPC ......... *G06F 1/1616* (2013.01); *G02B 5/3016* (2013.01); *G06F 1/1652* (2013.01); *H04M 1/0222* (2013.01); *H04M 1/0268* (2013.01); *H10K 59/8792* (2023.02); *H10K 59/8793* (2023.02); *H10K 2102/3026* (2023.02); *H10K 2102/311* (2023.02)

(58) Field of Classification Search
CPC . H04M 1/0222; H04M 1/0268; G06F 1/1616; G06F 1/1652
See application file for complete search history.

(56) References Cited

U.S. PATENT DOCUMENTS

| 10,960,704 | B2 * | 3/2021 | Czichos | ............... B42D 25/425 |
| 10,996,796 | B2 * | 5/2021 | Song | ................. G02F 1/133528 |
| 12,366,933 | B2 * | 7/2025 | Gu | ......................... G06F 3/0412 |
| 12,367,359 | B2 * | 7/2025 | Dinoev | ................ G06K 7/1417 |

(Continued)

FOREIGN PATENT DOCUMENTS

| JP | 2000-056115 | 2/2000 |
| JP | 2008-077451 | 4/2008 |

(Continued)

*Primary Examiner* — Anthony Q Edwards
(74) *Attorney, Agent, or Firm* — F. CHAU & ASSOCIATES, LLC

(57) ABSTRACT

A display device includes a display panel including a plurality of pixels, a folding area, a first non-folding area disposed on one side of the folding area, and a second non-folding area disposed on the other side of the folding area, a first adhesive layer disposed on one surface of the display panel, and a code pattern layer. The code pattern layer includes a light absorption layer disposed on one surface of the first adhesive layer, a base layer disposed on the light absorption layer, and a plurality of code patterns disposed on the base layer. A thickness of the base layer is smaller than a thickness of the first adhesive layer.

20 Claims, 23 Drawing Sheets

(56) References Cited

U.S. PATENT DOCUMENTS

| | | | |
|---|---|---|---|
| 2019/0018994 A1* | 1/2019 | Teraura | G06K 19/0614 |
| 2019/0204867 A1* | 7/2019 | Song | G09G 3/3208 |
| 2021/0174711 A1* | 6/2021 | Cho | G06F 1/1656 |
| 2024/0155946 A1* | 5/2024 | Wang | H10N 10/817 |
| 2025/0133653 A1* | 4/2025 | Shen | H05K 1/0269 |
| 2025/0200178 A1* | 6/2025 | Jiang | H04L 9/3213 |

FOREIGN PATENT DOCUMENTS

| | | |
|---|---|---|
| JP | 2016-081181 | 5/2016 |
| JP | 2016-146191 | 8/2016 |
| JP | 6565236 | 8/2019 |
| KR | 10-1431686 | 8/2014 |

\* cited by examiner

DISPLAY DEVICE

CROSS-REFERENCE TO RELATED APPLICATION

This application claims the benefit of Korean Patent Application No. 10-2022-0110726, filed on Sep. 1, 2022, in the Korean Intellectual Property Office, the disclosure of which is incorporated by reference herein in its entirety.

BACKGROUND

1. Technical Field

The present disclosure relates to a display device.

2. Description of the Related Art

As the information society develops, demands for display devices for displaying images are increasing in various forms. For example, display devices are being applied to various electronic devices such as smartphones, digital cameras, notebook computers, navigation devices, and smart televisions.

In order to increase portability of a display device while providing a wide display screen, a bendable display device in which a display area can be bent or a foldable display device in which a display area can be folded have been released recently.

In addition, a display device supports a touch input using a user's body part (e.g., a finger) and a touch input using an electronic pen (e.g., a stylus pen). Since the display device uses the touch input using the electronic pen, it can sense a touch input more precisely than when using only the touch input using the user's body part. A touch input using an electronic pen may be sensed by detecting a code pattern of the display device.

SUMMARY

Aspects of the present disclosure provide a display device capable of accurately sensing a touch input using a position input device and preventing a code pattern layer from peeling off.

However, aspects of the present disclosure are not restricted to the one set forth herein. The above and other aspects of the present disclosure will become more apparent to one of ordinary skill in the art to which the present disclosure pertains by referencing the detailed description of the present disclosure given below. According to an embodiment of the present disclosure, a display device includes a display panel including a plurality of pixels, a folding area, a first non-folding area disposed on one side of the folding area, and a second non-folding area disposed on the other side of the folding area, a first adhesive layer disposed on one surface of the display panel, and a code pattern layer. The code pattern layer includes a light absorption layer disposed on one surface of the first adhesive layer, a base layer disposed on the light absorption layer, and a plurality of code patterns disposed on the base layer. A thickness of the base layer is smaller than a thickness of the first adhesive layer.

In an embodiment, the code pattern layer further comprises a UV blocking layer covering the plurality of code patterns.

In an embodiment, a thickness of the code pattern layer is 100 um or less.

In an embodiment, further comprising a polarizing layer disposed between the first adhesive layer and the light absorption layer.

In an embodiment, further comprising a polarizing layer disposed on the code pattern layer, and a UV light blocking layer disposed on the polarizing layer.

In an embodiment, the thickness of the first adhesive layer is smaller than the thickness of the UV light blocking layer.

In an embodiment, the thickness of the UV light blocking layer is 100 um or less.

In an embodiment, the code pattern layer further comprises a second adhesive layer disposed between the light absorption layer and the base layer, and a thickness of the second adhesive layer is 2 um to 3 um.

In an embodiment, each of the plurality of code patterns comprises a first alignment layer, a second alignment layer disposed on the first alignment layer, and a crystal liquid layer disposed between the first alignment layer and the second alignment layer and including a cholesteric crystal liquid.

In an embodiment, liquid crystal molecules of the cholesteric crystal liquid are arranged spirally along a thickness direction of the liquid crystal layer.

In an embodiment, each of the plurality of code patterns reflects infrared light and, and the light absorption layer absorbs infrared light.

In an embodiment, the light absorption layer contacts the base layer.

In an embodiment, the plurality of code patterns are disposed in the folding area, the first non-folding area, and the second non-folding area.

In an embodiment, each of the plurality of code patterns does not overlap the plurality of pixels.

According to an embodiment of the present disclosure, a display device includes a display panel including a plurality of pixels, a folding area, a first non-folding area disposed on one side of the folding area, and a second non-folding area disposed on the other side of the folding area, a first adhesive layer disposed on one surface of the display panel, a polarizing layer disposed on the first adhesive layer, and a code pattern layer. The code pattern layer includes a light absorption layer disposed on the polarizing layer, a base layer disposed on the light absorption layer, and a plurality of code patterns disposed on the base layer. A thickness of the code pattern layer is smaller than a sum of a thickness of the polarizing layer and a thickness of the first adhesive layer.

In an embodiment, a thickness of the base layer is smaller than the thickness of the first adhesive layer.

In an embodiment, the thickness of the code pattern layer is 100 um or less.

In an embodiment, the code pattern layer further comprises a UV blocking layer covering the plurality of code patterns.

In an embodiment, the light absorption layer contacts the base layer.

In an embodiment, the plurality of code patterns are disposed in the folding area, the first non-folding area, and the second non-folding area. In the display device according to one embodiment, a touch input using the position input device can be accurately sensed by forming a code pattern with cholesteric liquid crystal and forming a code pattern layer including a light absorption layer. In addition, by adjusting the thickness of the code pattern layer, it is possible to prevent the code pattern layer in the foldable display device from peeling off.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

The present invention will now be described more fully hereinafter with reference to the accompanying drawings, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed as a second element without departing from the teachings of the present invention. Similarly, the second element could also be termed as the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, embodiments of the present disclosure will be described with reference to the accompanying drawings.

Hereinafter, specific embodiments will be described with reference to the accompanying drawings.

Figure 1:
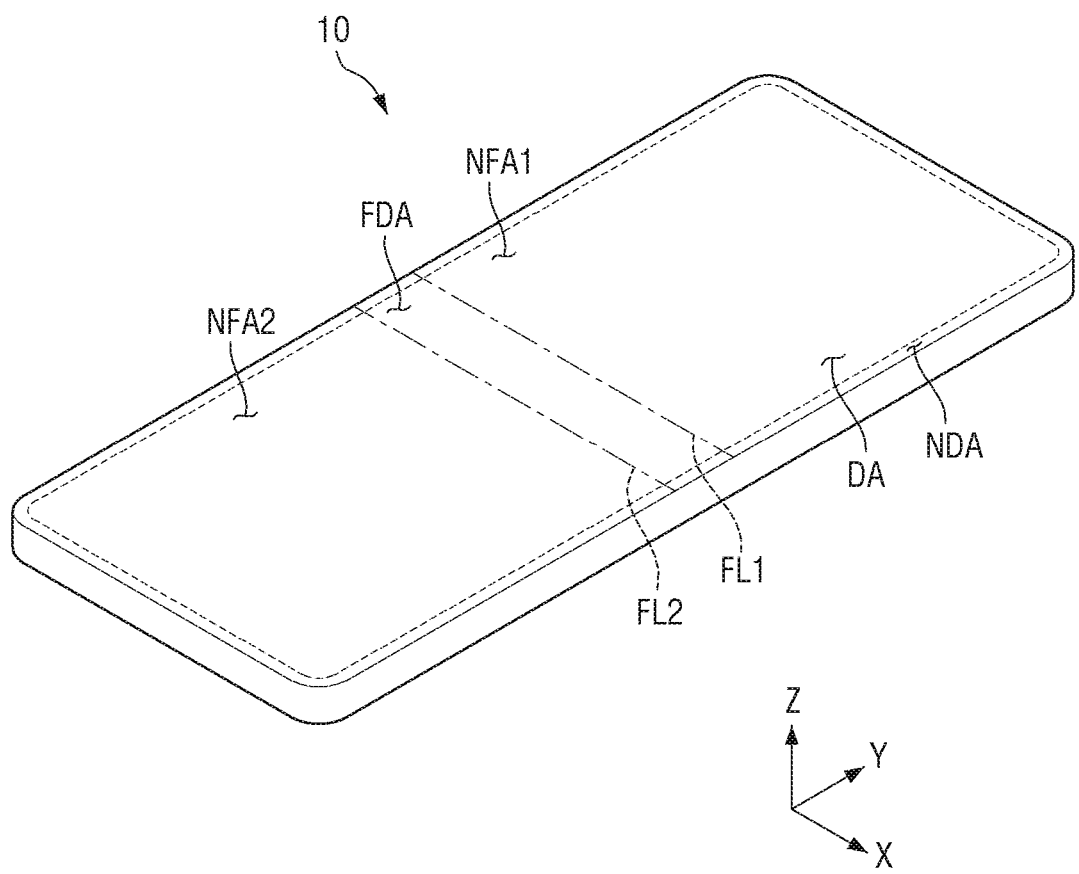
FIG. 1 is a perspective view illustrating a display device according to an embodiment of the present disclosure.
Figure 2:
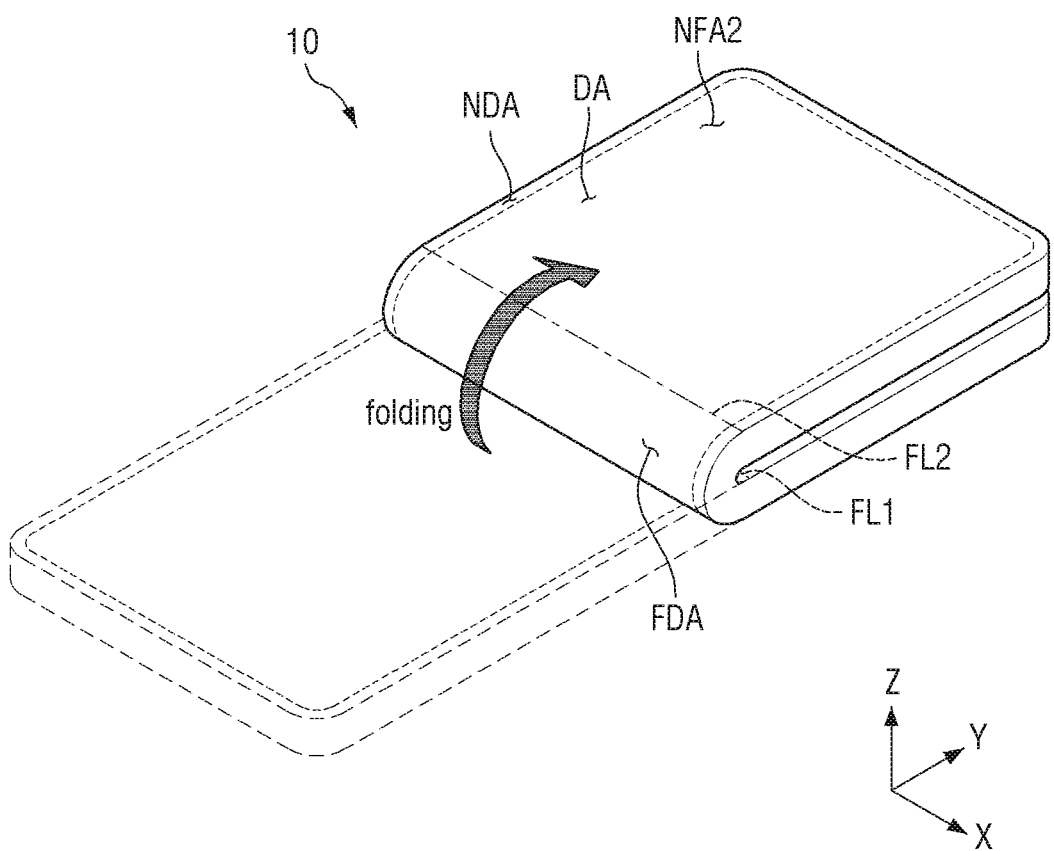
FIG. 2 is a perspective view of a display device, when folded, according to an embodiment of the present disclosure.

FIGS. 1 and 2 are perspective views showing a display device according to an embodiment of the present disclosure. FIG. 1 is a perspective view illustrating a display device, when unfolded, according to an embodiment of the present disclosure. FIG. 2 is a perspective view of a display device, when folded, according to an embodiment of the present disclosure.

In FIGS. 1 and 2, a first direction X is a direction parallel to one side of a display device 10 in a plan view, and may be, for example, a transverse direction of the display device 10. A second direction Y is a direction parallel to the other side of the display device 10 in contact with one side of the display device 10 in a plan view, and may be a longitudinal direction of the display device 10. A third direction Z may be a thickness direction of the display device 10.

The display device 10 may have a rectangular or square shape in a plan view. The display device 10 may have a rectangular shape with right-angled or rounded corners in a plan view. The display device 10 may include two short sides arranged in the first direction X and two long sides arranged in the second direction Y in a plan view.

The display device 10 includes a display area DA and a non-display area NDA. In a plan view, the shape of the display area DA may correspond to the shape of the display device 10. For example, when the display device 10 has a rectangular shape in a plan view, the display area DA may also have a rectangular shape.

The display area DA may be an area including a plurality of pixels to display an image. The plurality of pixels may be arranged in a matrix. The plurality of pixels may have a rectangular, rhombic, or square shape in a plan view, without being limited thereto. For example, the plurality of pixels may have a quadrilateral shape other than a rectangular, rhombic, or square shape, a polygonal shape other than a quadrilateral shape, a circular shape, or an elliptical shape.

The non-display area NDA may be an area that does not include pixels and does not display an image. The non-display area NDA may be disposed around the display area DA. The non-display area NDA may be disposed to surround the display area DA as shown in FIGS. 1 and 2, but is not limited thereto. The display area DA may be partially surrounded by the non-display area NDA.

The display device 10 may maintain both a folded state and an unfolded state. As shown in FIG. 2, the display device 10 may be folded in an in-folding manner in which the display area DA is disposed on the inside thereof. If the display device 10 is folded in an in-folding manner, portions of the front surface of the display device 10 may face each other. Alternatively, the display device 10 may be folded in an out-folding manner in which the display area DA is disposed on the outside. When the display device 10 is folded in the out-folding manner, portions of the back surface of the display device 10 may face each other.

The display device 10 may include a folding area FDA, a first non-folding area NFA1, and a second non-folding area NFA2. The folding area FDA may be an area in which the display device 10 is folded or bent, and the first and second non-folding areas NFA1 and NFA2 may be areas in which the display device 10 is not folded or bent.

The first non-folding area NFA1 may be disposed on one side (e.g., an upper side) of the folding area FDA. The second non-folding area NFA2 may be disposed on the other side (e.g., a lower side) of the folding area FDA. The folding area FDA, which is defined by a first folding line FL1 and a second folding line FL2, may be a curved area with a predetermined curvature. The first folding line FL1 may be the boundary between the folding area FDA and the first non-folding area NFA1, and the second folding line FL2 may be the boundary between the folding area FDA and the second non-folding area NFA2.

The first folding line FL1 and the second folding line FL2 may extend in the first direction X as shown in FIGS. 1 and 2. In this case, the display device 10 may be folded in the second direction Y. Accordingly, the length of the display device 10 in the second direction Y may be reduced to approximately half, so that a user can conveniently carry the display device 10.

When the first folding line FL1 and the second folding line FL2 extend in the first direction X-axis direction as shown in FIGS. 1 and 2, the length of the folding area FDA in the second direction Y may be shorter than the length of one direction X-axis direction. Also, the length of the first non-folding area NFA1 in the second direction Y-axis direction may be longer than the length of the first non-folding area NFA1 in the first direction X-axis direction. The length of the second non-folding area NFA2 in the second direction Y-axis direction may be longer than the length of the second non-folding area NFA2 in the first direction X-axis direction.

Each of the display area DA and the non-display area NDA may overlap at least one of the folding area FDA, the first non-folding area NFA1, and the second non-folding area NFA2. FIGS. 1 and 2 illustrate that each of the display area DA and the non-display area NDA overlaps the folding area FDA, the first non-folding area NFA1, and the second non-folding area NFA2.

Figure 3:
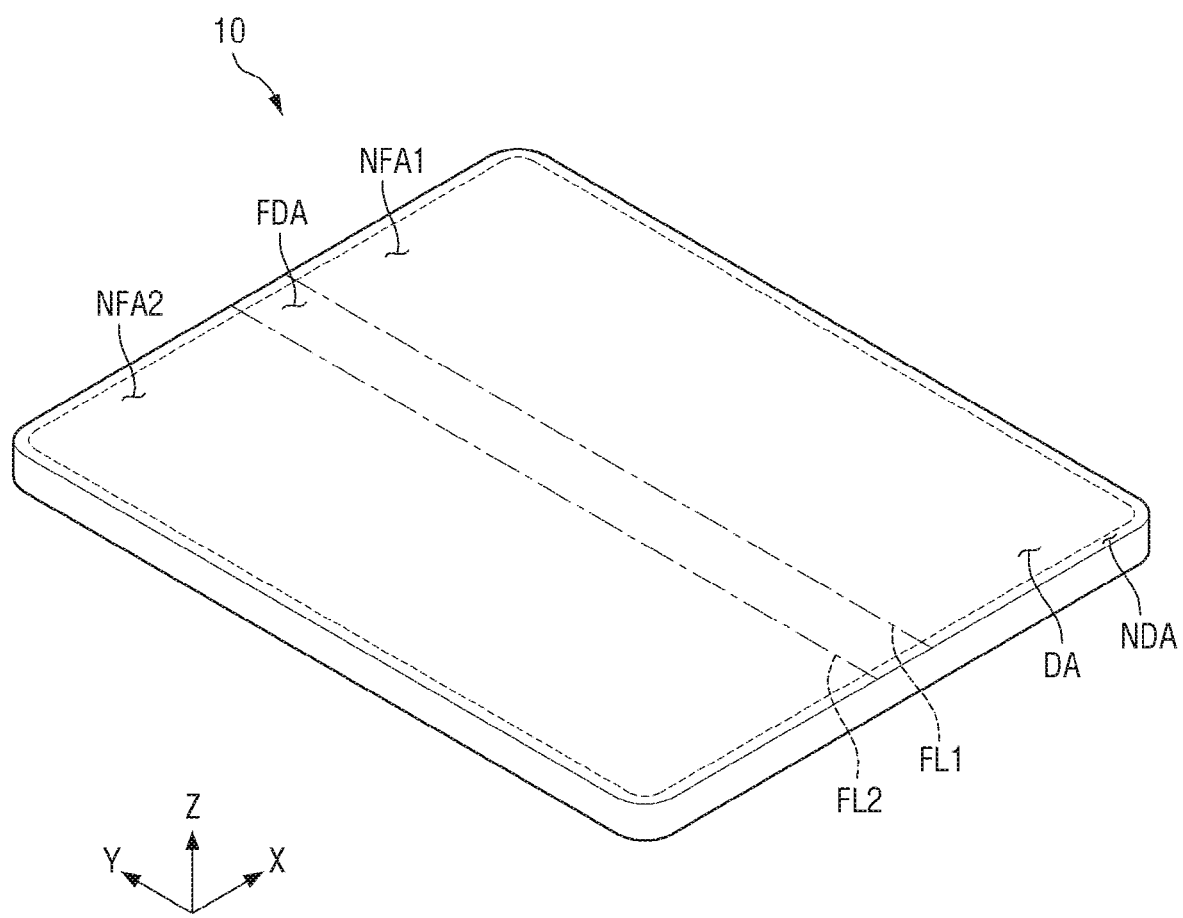
FIG. 3 is a perspective view of a display device, when unfolded, according to an embodiment of the present disclosure.
Figure 4:
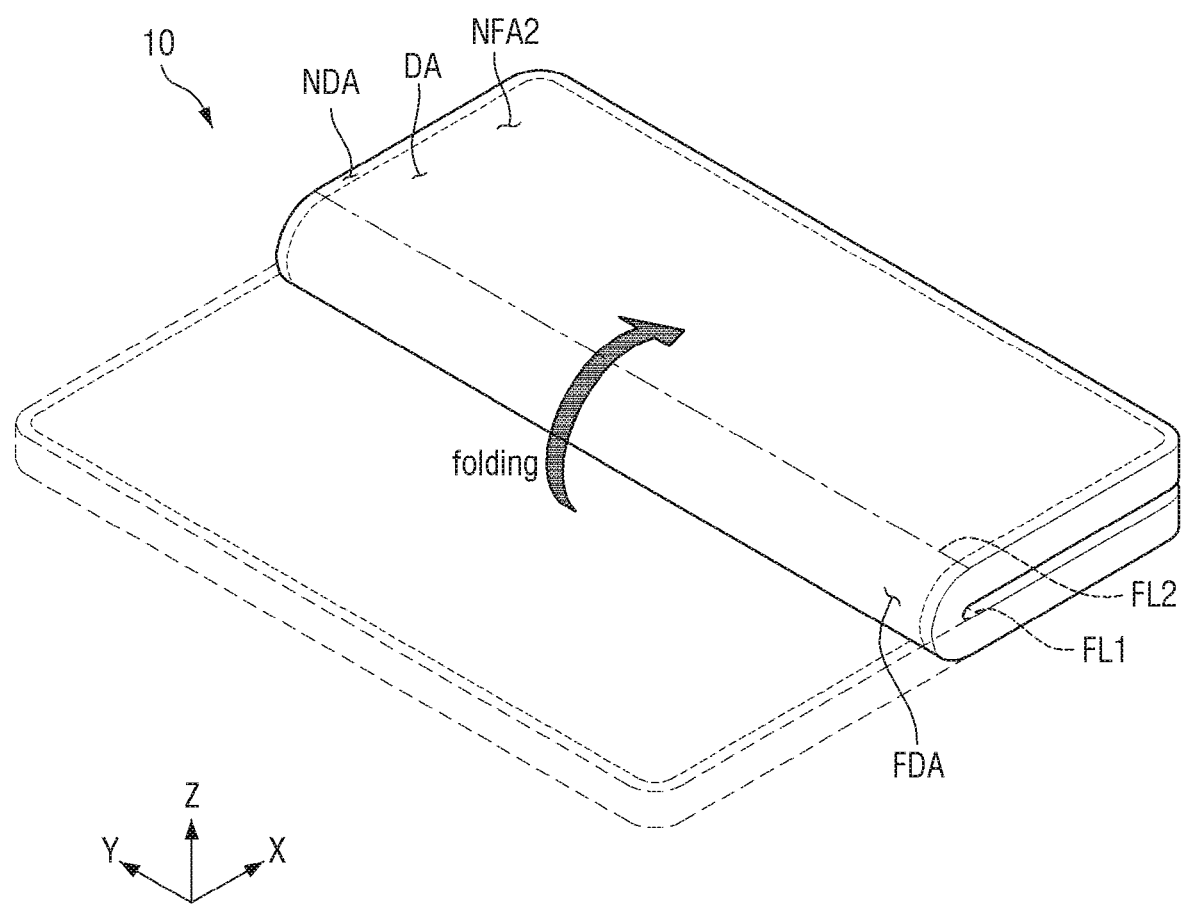
FIG. 4 is a perspective view of a display device, when folded, according to an embodiment of the present disclosure.

FIGS. 3 and 4 are perspective views illustrating a display device according to an embodiment of the present disclosure. FIG. 3 is a perspective view illustrating a display device in an unfolded state according to an embodiment of the present disclosure. FIG. 4 is a perspective view illustrating a display device in a folded state according to an embodiment of the present disclosure.

In FIGS. 3 and 4, since the first folding line FL1 and the second folding line FL2 extend in the second direction Y-axis direction, and the display device 10 is folded in the first direction X-axis direction, the length of the display device 10 in the first direction X-axis direction may be reduced by approximately half. Therefore, the only difference from the embodiments of FIGS. 1 and 2 is that the user can conveniently carry the display device 10, and thus, the descriptions of embodiments of FIGS. 3 and 4 will be omitted.

Figure 5:
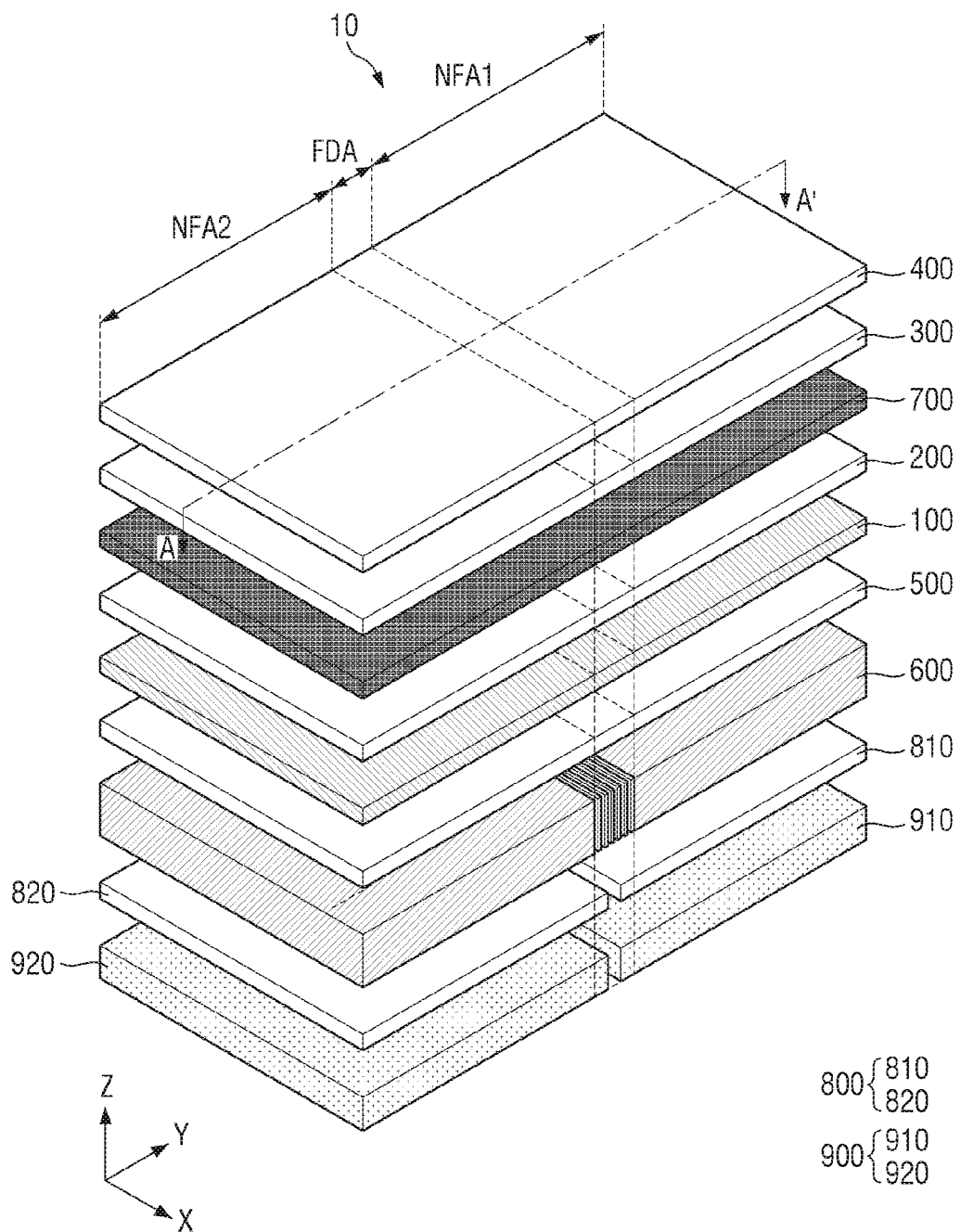
FIG. 5 is an exploded perspective view of an example of the display device shown in FIG. 1 according to an embodiment of the present disclosure.
Figure 6:
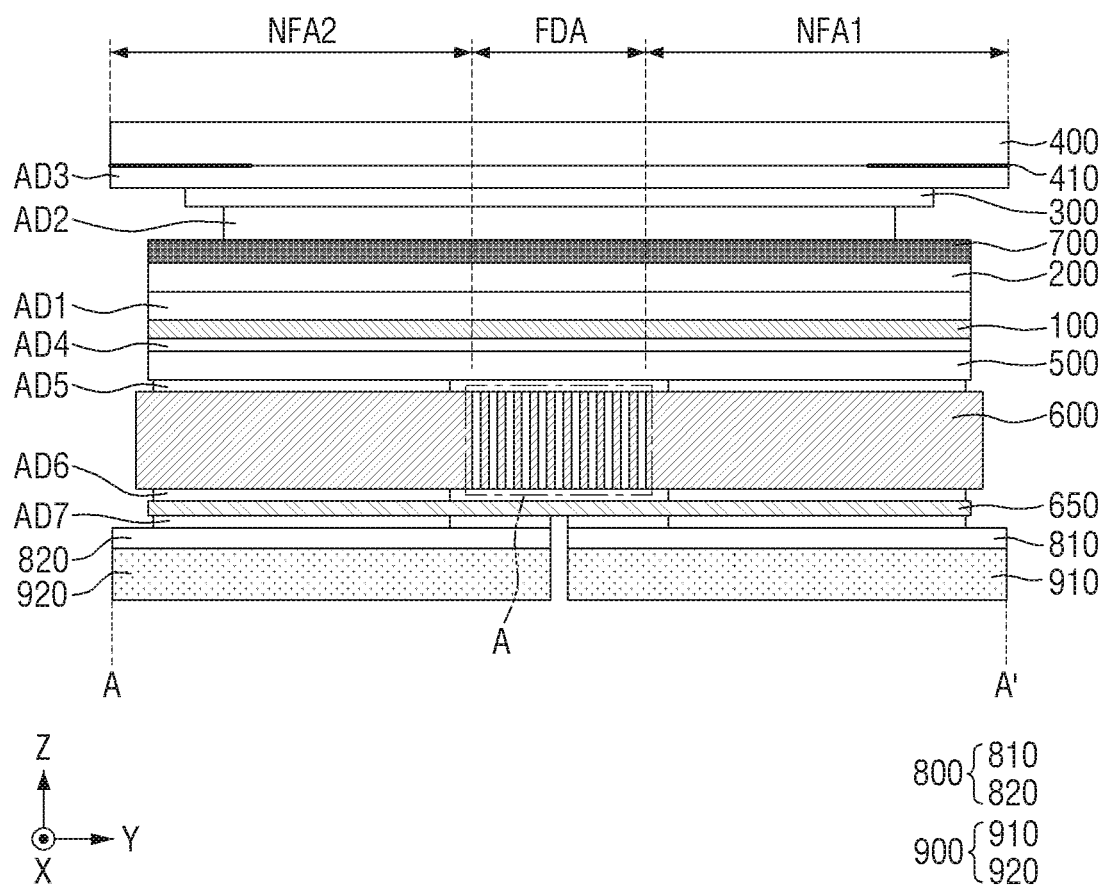
FIG. 6 is a cross-sectional view showing an example of the display device taken along line A-A' of FIG. 5 according to an embodiment of the present disclosure.
Figure 7:
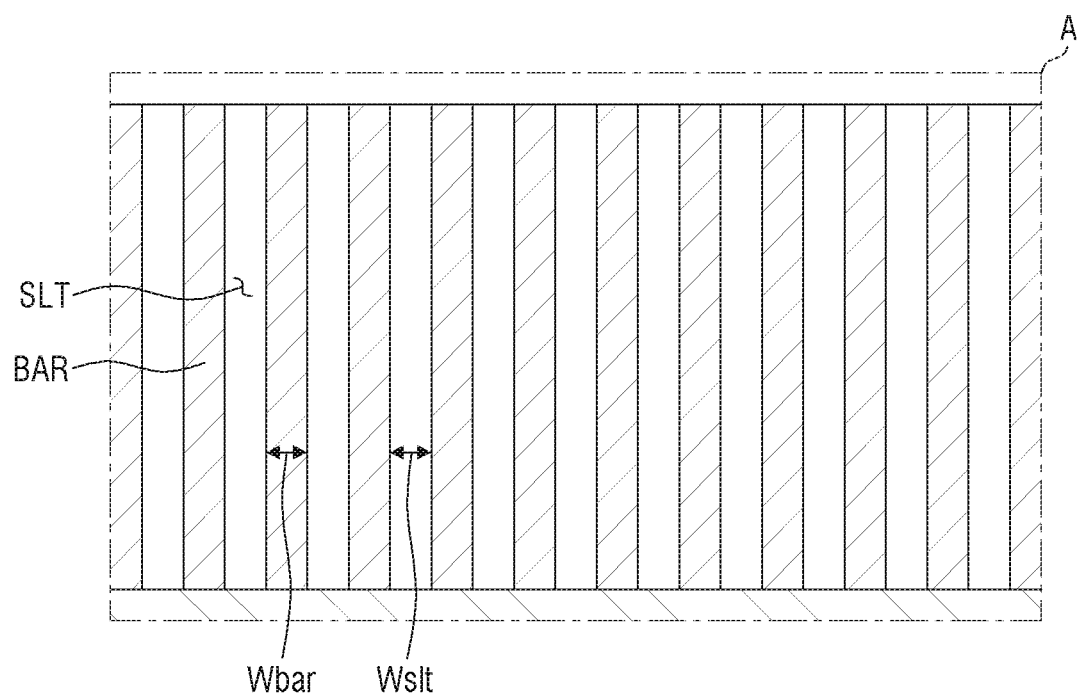
FIG. 7 is an enlarged cross-sectional view of area A of FIG. 6 according to an embodiment of the present disclosure.

FIG. 5 is an exploded perspective view of an example of the display device shown in FIG. 1 according to an embodiment of the present disclosure. FIG. 6 is a cross-sectional view showing an example of the display device taken along line A-A' of FIG. 5 according to an embodiment of the present disclosure. FIG. 7 is an enlarged cross-sectional view of area A of FIG. 6 according to an embodiment of the present disclosure.

Referring to FIGS. 5 and 6, the display device 10 according to one embodiment includes a display panel 100, a polarizing layer 200, a code pattern layer 700, a window 300, a protective layer 400, a panel bottom member 500, a light blocking member 600, a shielding member 800, and a heat dissipation member 900.

A panel for displaying an image may be an organic light emitting display panel using an organic light emitting diode, a quantum dot light emitting display panel including a quantum dot light emitting layer, an inorganic light emitting display panel including an inorganic semiconductor, or a micro light emitting display panel using a micro light emitting diode (LED). In the following description, it is assumed that the display panel 100 is an organic light emitting display panel, but the present disclosure is not limited thereto. The display panel 100 will be described in detail later with reference to FIG. 10.

The polarizing layer 200 may be disposed on the front surface of the display panel 100. The front surface of the display panel 100 may be a display surface on which an image is displayed. The polarizing layer 200 may be adhered to the front surface of the display panel 100 by a first adhesive member AD1. The first adhesive member AD1 may be an optically clear adhesive (OCA) film or an optically clear resin (OCR). The polarizing layer 200 may include a phase retardation layer such as a linear polarizer plate and a quarter-wave ($\lambda/4$) plate.

The code pattern layer 700 may be disposed on the front surface of the polarizing layer 200. In addition, the code pattern layer 700 may be disposed to overlap the display panel 100. For example, the code pattern layer 700 may be disposed in the first non-folding area NFA1, the second non-folding area NFA2 and the folding area FDA.

The code pattern layer 700 may selectively reflect light incident from the outside. For example, the code pattern layer 700 may include a code pattern CP (i.e., a position code pattern), and the code pattern CP may change and reflect the wavelength of light incident from the outside. Also, light incident from the outside may be absorbed in an area where the code pattern CP is not disposed in the code pattern layer 700. Accordingly, the code pattern layer 700 may selectively reflect or absorb light incident from the outside. This will be described later with reference to FIGS. 11 to 14.

A second adhesive member AD2 may be disposed on the code pattern layer 700. The second adhesive member AD2 may be a transparent adhesive layer or a transparent adhesive resin. Alternatively, the second adhesive member AD2 may be a pressure-sensitive adhesive. The second adhesive member AD2 may be flexible and may include an insulating material.

A thickness of the second adhesive member AD2 may be smaller than a thickness of the code pattern layer 700. For example, when the display device 10 is folded, in order to reduce the folding stress of the code pattern layer 700, the thickness of the code pattern layer 700 may be 100 μm or less. In addition, the second adhesive member AD2 may be desirable to maintain adhesion to the code pattern layer 700. Accordingly, the thickness of the second adhesive member AD2 may be smaller than the thickness of the code pattern layer 700. This will be described later with reference to FIGS. 11 to 14.

Also, the thickness of the code pattern layer 700 may be smaller than the sum of the thicknesses of the second adhesive member AD2 and the polarizing layer 200. For example, even when the thickness of the code pattern layer 700 is greater than the thickness of the second adhesive member AD2 and the thickness of the code pattern layer 700 is greater than the thickness of the polarizing layer 200, the thickness of the code pattern layer 700 may be smaller than the sum of the thicknesses of the second adhesive member AD2 and the polarizing layer 200.

The window 300 may be disposed on the front surface of the second adhesive member AD2. The window 300 may be adhered to the front surface of the code pattern layer 700 by the second adhesive member AD2. The window 300 may be made of a transparent material and may contain, e.g., glass or plastic. For example, the window 300 may be, but not necessarily, an ultra thin glass (UTG) with a thickness of 0.1 mm or less or a transparent polyimide film.

The protective layer 400 may be disposed on the front surface of the window 300. The protective layer 400 may be adhered to the front surface of the window 300 by a third adhesive member AD3. The third adhesive member AD3 may be an optically clear adhesive layer or an optically clear resin. The protective layer 400 may perform at least one of functions of prevention of scattering, impact absorption, prevention of scratch, prevention of fingerprint smudges, and prevention of glare on the window 300.

The light blocking layer 410 may be disposed on the back surface of the protective layer 400. The light blocking layer 410 may be disposed on the edge of the window protective barrier 400. The light blocking layer 410 may include a light blocking material capable of blocking light. For example, the light blocking layer 410 may contain an organic black pigment or an inorganic black pigment such as carbon black.

The panel bottom member 500 may be disposed on the back surface of the display panel 100. The panel bottom member 500 may be adhered to the back surface of the display panel 100 by a fourth adhesive member AD4. The fourth adhesive member AD4 may be a pressure sensitive adhesive (PSA).

The panel bottom member 500 may be a buffer layer for absorbing an impact from the outside. The panel bottom member 500 absorbs an external shock to prevent the display panel 100 from being damaged. The panel bottom member 500 may be formed of a single layer or multiple layers. For example, the buffer layer may include an elastic material, such as rubber, a urethane-based material, and a sponge formed by using an acrylic-based material in a foam molding process.

Although it is illustrated in FIGS. 5 and 6 that the panel bottom member 500 is disposed in the folding area FDA, the present disclosure is not limited thereto. For example, the panel bottom member 500 may be removed from the folding area FDA so that the display device 10 is smoothly folded.

The light blocking member 600 may be disposed on the back surface of the panel bottom member 500. The light blocking member 600 may be adhered to the back surface of the panel bottom member 500 by fifth adhesive members AD5. The fifth adhesive members AD5 may not be disposed in the folding area FDA to reduce folding stress of the display device 10. One of the fifth adhesive members AD5 may be disposed in the first non-folding area NFA1, and the other may be disposed in the second non-folding area NFA2. The fifth adhesive members AD5 may be a pressure sensitive adhesive (PSA).

The light blocking member 600 may be a polymer including carbon fibers or glass fibers. When light blocking member 600 includes carbon fiber, the polymer may be epoxy, polyester, polyamide, polycarbonate, polypropylene, polybutylene, or vinyl ester. When light blocking member 600 includes glass fiber, the polymer may be epoxy, polyester, polyamide, or vinyl ester.

When the light blocking member 600 includes carbon fibers, the Young's modulus of the light blocking member 600 may be approximately 20 GPa to 30 GPa. When the light blocking member 600 includes glass fibers, the Young's modulus of the light blocking member 600 may be approximately 70 GPa to 130 GPa.

Although the width of the carbon fiber yarn or the glass fiber yarn of the light blocking member 600 may be approximately 7 μm to 10 μm, the embodiments of this specification are not limited thereto. Although the thickness of the light blocking member 600 may be approximately 100 μm to 300 μm, the embodiments of this specification are not limited thereto. The thickness of the light blocking member 600 may be thicker than the thickness of the shielding member 800. Also, the thickness of the light blocking member 600 may be greater than the thickness of the display panel 100.

The light blocking member 600 may include a plurality of bars BAR disposed in the folding area FDA so that it can be easily bent in the folding area FDA. An extension direction of each of the plurality of bars BAR may be substantially the same as an extension direction of the first folding line FL1 and an extension direction of the second folding line FL2. That is, the plurality of bars BAR may extend in the first direction X-axis direction. The plurality of bars BAR may be arranged in the second direction Y-axis direction. A slit SLT may be disposed between adjacent bars BAR among the plurality of bars BAR. When a width Wbar of each of the plurality of bars BAR is greater than a width Wslt of each of the slits SLT, the light blocking member 600 may be difficult to bend. Therefore, the width Wbar of each of the plurality of bars BAR may be smaller than the width Wslt of each of the slits SLT as shown in FIG. 7.

The light blocking member 600 may have a structure in which a plurality of prepregs are stacked. For example, the light blocking member 600 may have a structure in which first prepregs parallel to the folding lines FL1 and FL2 and second prepregs perpendicular to the folding lines FL1 and FL2 are alternately stacked. The first prepregs and the second prepregs may be stacked by hot pressing or an autoclave.

A buffer member 650 may be disposed on the back surface of the light blocking member 600. The buffer member 650 may be attached to the back surface of the light blocking member 600 by sixth adhesive members AD6. The sixth adhesive members AD6 may not be disposed in the folding area FDA to reduce folding stress of the display device 10. One of the sixth adhesive members AD6 may be disposed in the first non-folding area NFA1, and the other may be disposed in the second non-folding area NFA2. The sixth adhesive members AD6 may be a pressure sensitive adhesive (PSA).

The buffer member 650 may absorb an external impact to prevent the light blocking member 600 from being damaged. The buffer member 650 may include an elastic material such as a rubber, a urethane-based material, and a sponge in which an acrylic-based material is foam-molded.

The shielding member 800 includes a first shielding member 810 and a second shielding member 820. The first shielding member 810 and the second shielding member 820 may be disposed on the rear surface of the buffer member 650.

The first shielding member 810 and the second shielding member 820 may not be disposed in the folding area FDA to reduce folding stress of the display device 10. The first shielding member 810 may be disposed in the first non-folding area NFA1, and the second shielding member 820 may be disposed in the second non-folding area NFA2. A gap, measured in the Y-axis direction, between the first shielding member 810 and the second shielding member 820 may overlap the folding area FDA and may be smaller than the width, measured in the Y-axis direction, of the folding area FDA. In an embodiment, the gap between the first shielding member 810 and the second shielding member 820 may be vertically aligned with the folding area FDA or may be disposed under the folding area FDA. The first shielding member 810 and the second shielding member 820 may be adhered to the rear surface of the buffer member 650 by seventh adhesive members AD7. The seventh adhesive members AD7 may be a pressure sensitive adhesive (PSA).

The heat dissipation member 900 includes a first heat dissipation member 910 and a second heat dissipation member 920. The first heat dissipation member 910 and the second heat dissipation member 920 may be disposed on the rear surface of the shielding member 800.

The first heat dissipation member 910 and the second heat dissipation member 920 may not be disposed in the folding area FDA to reduce folding stress of the display device 10. The first heat dissipation member 910 may be disposed in the first non-folding area NFA1, and the second heat dissipation member 920 may be disposed in the second non-folding area NFA2. A gap, measured in the Y-axis direction, between the first heat dissipation member 910 and the second heat dissipation member 920 may overlap the folding area FDA and may be smaller than the width, measured in the Y-axis direction, of the folding area FDA. In an embodiment, the gap between the first heat dissipation member 910 and the second heat dissipation member 920 may be vertically aligned with the folding area FDA or may be disposed under the folding area FDA.

The first heat dissipation member 910 and the second heat dissipation member 920 may be metal films such as copper, nickel, ferrite and silver, which have excellent thermal conductivity. Accordingly, heat generated by the display device 10 can be released to the outside by the first heat dissipation member 910 and the second heat dissipation member 920.

Figure 8:
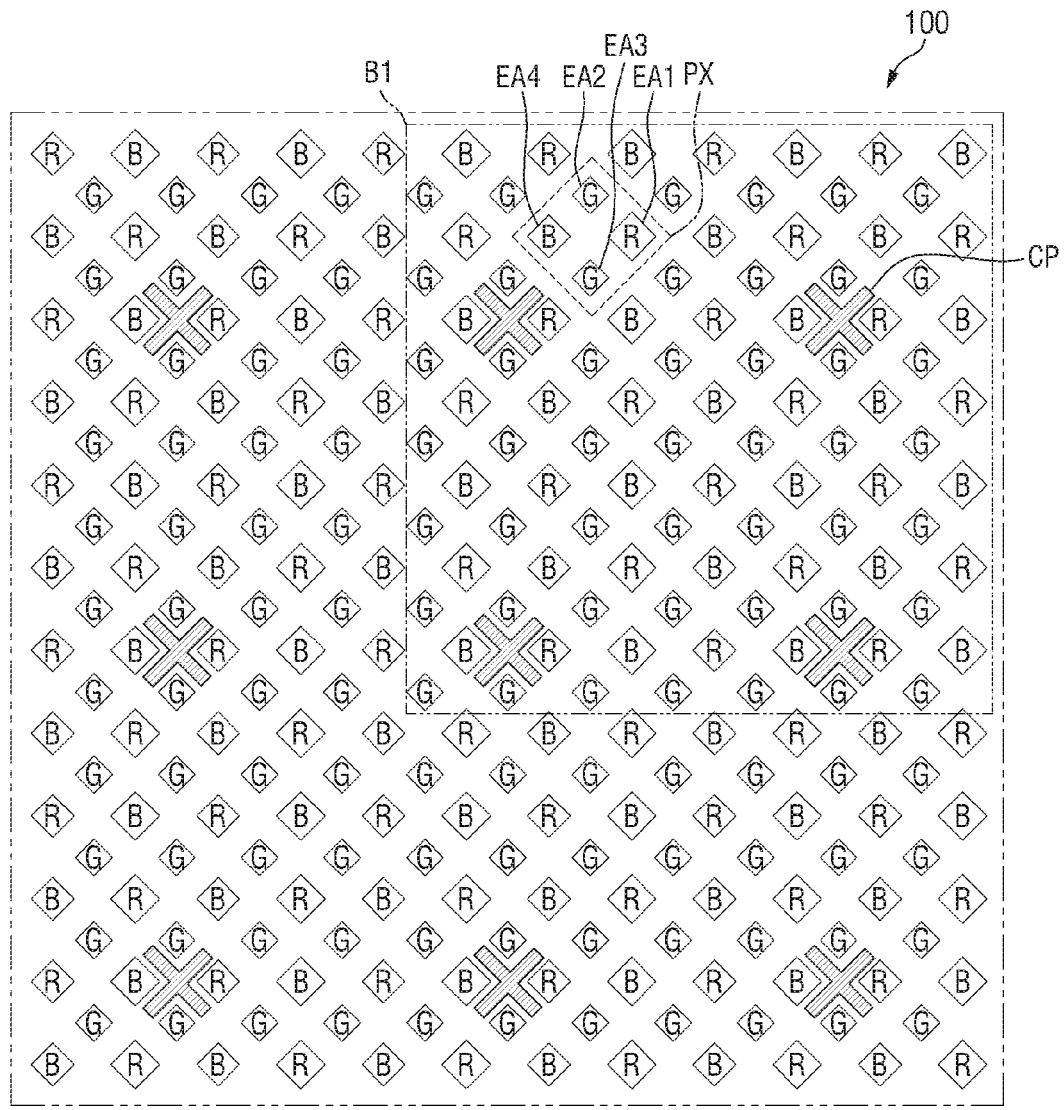
FIG. 8 is an enlarged view of a display panel according to an embodiment of the present disclosure.
Figure 9:
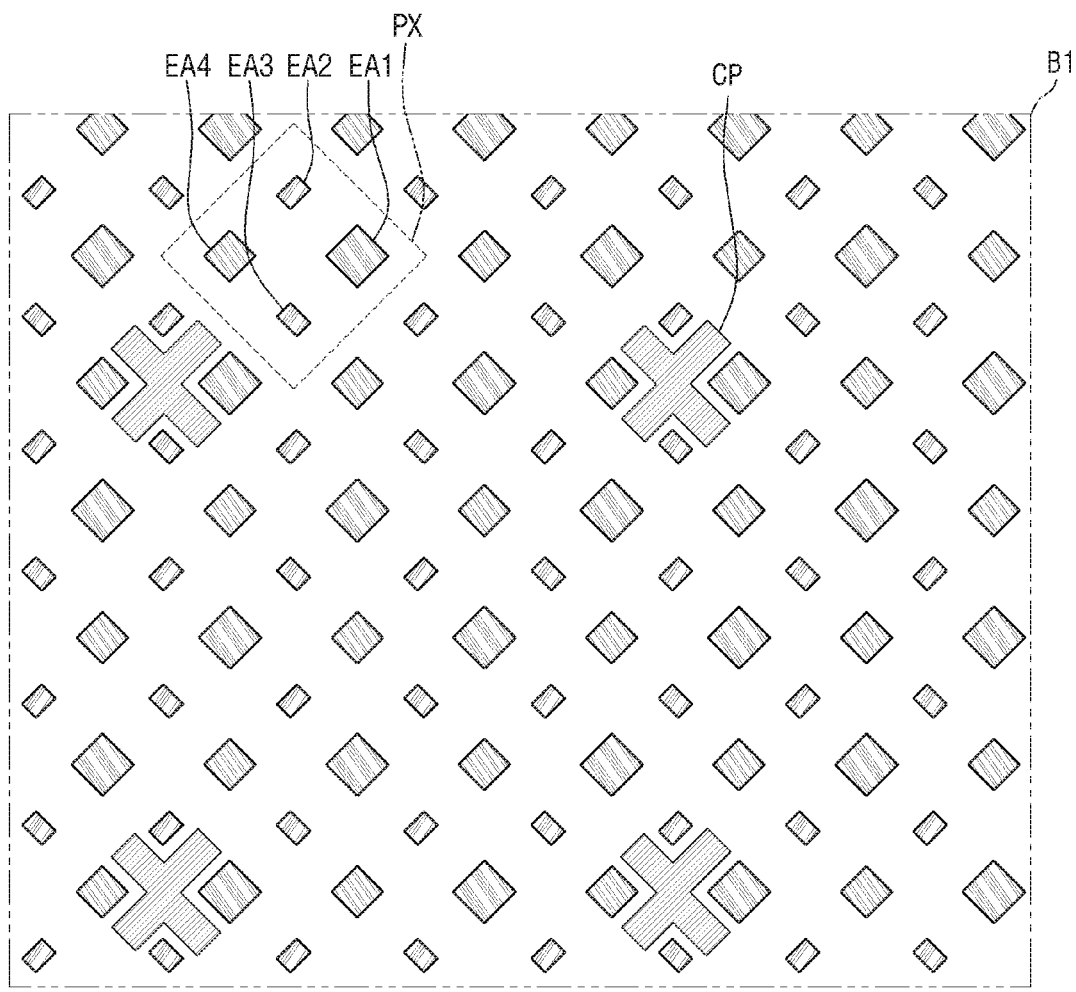
FIG. 9 is an enlarged plan view of area B1 of FIG. 8 according to an embodiment of the present disclosure.

FIG. 8 is an enlarged view of a display panel according to an embodiment of the present disclosure. FIG. 9 is an enlarged cross-sectional view of part B1 of FIG. 8 according to an embodiment of the present disclosure.

Referring to FIGS. 8 and 9, each of a plurality of unit pixels PX may include first to third sub-pixels, and each of the first to third sub-pixels may include first to fourth light-emitting areas EA1, EA2, EA3, and EA4. For example, the first light-emitting area EA1 included in the first sub-pixel may emit light of a first color or red light, the second light-emitting area EA2 included in the second sub-pixel may emit light of a second color or green light, and the third light-emitting area EA3 included in the third sub-pixel may emit light of a third color or blue light. Alternatively, each of the plurality of unit pixels PX may include first to fourth sub-pixels, and each of the first to fourth sub-pixels may include the first to fourth light-emitting areas EA1, EA2, EA3, and EA4. The fourth light-emitting area EA4 included in the fourth sub-pixel may emit light of any one color among red, green, and blue, and may also emit white light. Each of the unit pixels PX may express a white grayscale through the first to fourth light-emitting areas EA1, EA2, EA3, and EA4. In addition, gradations of various colors such as white may be expressed by a combination of light emitted from the first to fourth light-emitting areas EA1, EA2, EA3, and EA4. Hereinafter, an example in which each of the unit pixels PX includes the first to fourth light-emitting areas EA1, EA2, EA3, and EA4 will be described.

As shown in FIGS. 8 and 9, each of the code patterns CP (i.e., position code patterns) may be formed in a predetermined position code area in the form of a predetermined pattern. Specifically, each of the code patterns CP may be formed in a corresponding position between first, second, third, and fourth light-emitting areas EA1, EA2, EA3, and EA4. Each of the code patterns CP may have a predetermined planar pattern shape.

Each of the code patterns CP may be formed in a corresponding position area between adjacent sub-pixels SP and may have the shape of a cross pattern. For example, each of the position code patterns CP may be formed in a corresponding position area between four adjacent sub-pixels SP and may have the shape of a cross pattern. The code patterns CP may not overlap each sub-pixel and may be disposed in the code pattern layer 700.

The code patterns CP may be formed between the sub-pixels SP in various other shapes, for example, in at least one polygonal shape from among a rectangular shape, a square shape, and a rhombus shape or a hybrid shape obtained by combining the at least one polygonal shape.

The code patterns CP may be formed to have different sizes, different widths in at least one direction, different lengths in at least one direction, or different areas in at least one direction from one another.

Figure 10:
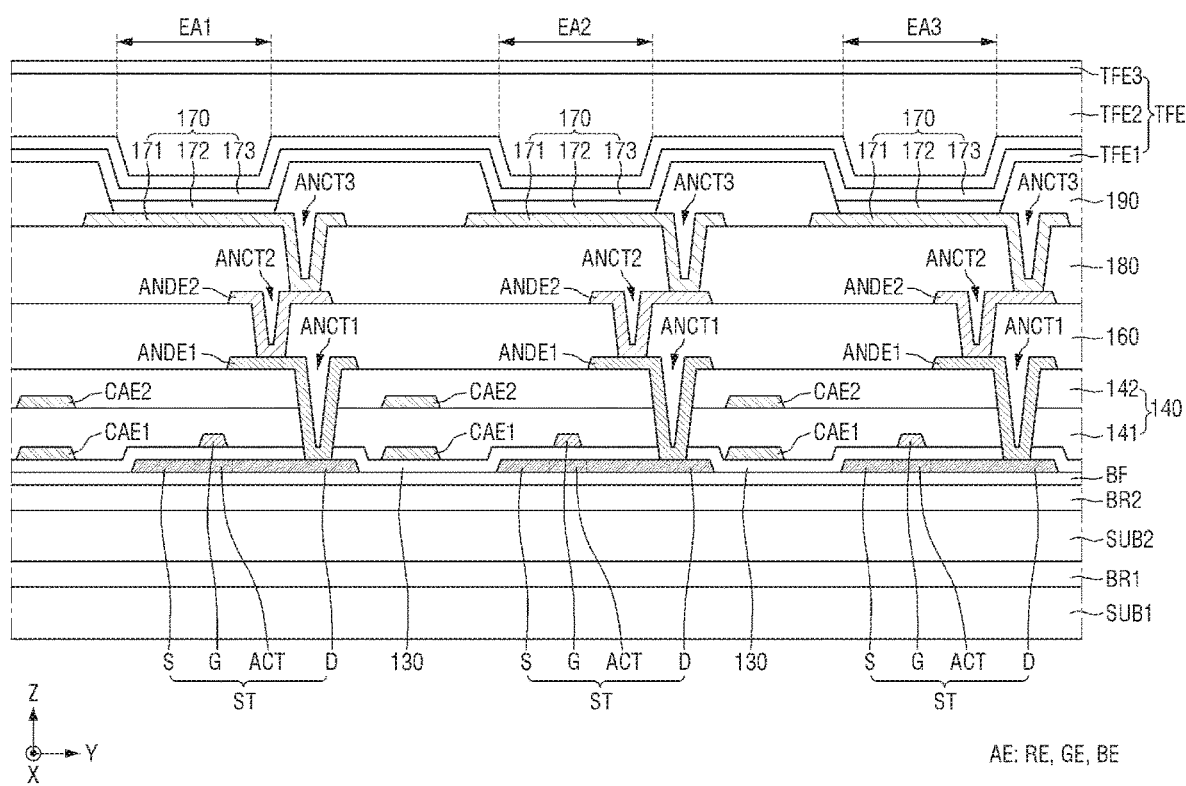
FIG. 10 is a cross-sectional view showing an example of the display panel of FIG. 9 according to an embodiment of the present disclosure.

FIG. 10 is a cross-sectional view showing an example of the display panel of FIG. 9 according to an embodiment of the present disclosure.

Referring to FIG. 10, a first barrier layer BR1 may be disposed on a first substrate SUB1, a second substrate SUB2 may be disposed on the first barrier layer BR1, and a second barrier layer BR2 may be disposed on the second substrate SUB2.

The first substrate SUB1 and the second substrate SUB2 may be formed of an insulating material such as a polymer resin. For example, the first substrate SUB1 and the second substrate SUB2 may be formed of polyimide. Each of the first substrate SUB1 and the second substrate SUB2 may be a flexible substrate that is bendable, foldable, or rollable.

Each of the first barrier layer BR1 and the second barrier layer BR2 is a film for protecting the thin film transistors of the thin film transistor layer TFTL and emission layers 172 of the light-emitting element layer EML from moisture that may infiltrate into the first substrate SUB1 and the second substrate SUB2, which is susceptible to moisture. Each of the first barrier layer BR1 and the second barrier layer BR2 may include a plurality of inorganic films that are alternately stacked. For example, each of the first barrier layer BR1 and the second barrier layer BR2 may be formed as a multilayer in which one or more inorganic layers such as a silicon nitride layer, a silicon oxynitride layer, a silicon oxide layer, a titanium oxide layer, and an aluminum oxide layer are alternately stacked.

A buffer layer BF may be disposed on the second barrier layer BR2. The buffer layer BF may be formed of at least one inorganic layer. For example, the buffer layer BF may include one or more inorganic layers of a silicon nitride layer, a silicon oxynitride layer, a silicon oxide layer, a titanium oxide layer and an aluminum oxide layer.

A thin film transistor ST may be disposed on the buffer layer BF. The thin film transistor ST may include an active layer ACT, a gate electrode G, a source electrode S, and a drain electrode D.

The active layer ACT, the source electrode S and the drain electrode D may be disposed on the buffer layer BF. The active layer ACT may include polycrystalline silicon, single crystal silicon, low-temperature polycrystalline silicon, amorphous silicon, or an oxide semiconductor. The source electrode and the drain electrode may have conductivity by doping a silicon semiconductor or an oxide semiconductor with ions or impurities. The active layer ACT may overlap the gate electrode G in the third direction Z-axis direction, and the source electrode S and the drain electrode D may not overlap the gate electrode G in the third direction Z-axis direction.

A gate insulator 130 may be disposed on the active layer ACT, the source electrode S and the drain electrode D of the thin film transistor ST. The gate insulator 130 may be formed of an inorganic layer, for example, a silicon nitride layer, a silicon oxynitride layer, a silicon oxide layer, a titanium oxide layer, or an aluminum oxide layer.

The gate electrode G and a first capacitor electrode CAE1 may be disposed on the gate insulator 130. The gate electrode G may overlap the active layer ACT in the third direction (Z-axis direction). The first capacitor electrode CAE1 may overlap a second capacitor electrode CAE2 in the third direction (Z-axis direction). The gate electrode G and the first capacitor electrode CAE1 may be made up of a single layer or multiple layers of one of molybdenum (Mo), aluminum (Al), chromium (Cr), gold (Au), titanium (Ti), nickel (Ni), neodymium (Nd), copper (Cu), and an alloy thereof.

A first interlayer dielectric layer 141 may be disposed on the gate electrode G and the first capacitor electrode CAE1. The first interlayer dielectric layer 141 may be formed of an inorganic layer, for example, a silicon nitride layer, a silicon oxynitride layer, a silicon oxide layer, a titanium oxide layer, or an aluminum oxide layer. The first interlayer dielectric layer 141 may include a number of inorganic layers.

The second capacitor electrode CAE2 may be disposed on the first interlayer dielectric layer 141. The second capacitor electrode CAE2 may overlap the gate electrode G in the third direction (z-axis direction). Since the first interlayer dielectric layer 141 has a predetermined dielectric constant, a capacitor can be formed by the first capacitor electrode CAE1, the second capacitor electrode CAE2 and the first interlayer dielectric layer 141 disposed therebetween. The second capacitor electrode CAE2 may be made up of a single layer or multiple layers of one of molybdenum (Mo), aluminum (Al), chromium (Cr), gold (Au), titanium (Ti), nickel (Ni), neodymium (Nd), copper (Cu), and an alloy thereof.

A second interlayer dielectric layer 142 may be disposed over the second capacitor electrode CAE2. The second interlayer dielectric layer 142 may be formed of an inorganic layer, for example, a silicon nitride layer, a silicon oxynitride layer, a silicon oxide layer, a titanium oxide layer, or an aluminum oxide layer. The second interlayer dielectric layer 142 may include a number of inorganic layers.

A first anode connection electrode ANDE1 may be disposed on the second interlayer dielectric layer 142. The first anode connection electrode ANDE1 may be connected to the drain electrode D through a first anode contact hole ANCT1 that penetrates the first interlayer dielectric layer 141 and the second interlayer dielectric layer 142 to expose the drain electrode D. The first anode connection electrode ANDE1 may be made up of a single layer or multiple layers of one of molybdenum (Mo), aluminum (Al), chromium (Cr), gold (Au), titanium (Ti), nickel (Ni), neodymium (Nd), copper (Cu), and an alloy thereof.

A first organic layer 160 may be disposed on the first anode connection electrode ANDE1 for planarization. The first organic layer 160 may be formed as an organic layer such as an acryl resin, an epoxy resin, a phenolic resin, a polyamide resin, and a polyimide resin.

A second anode connection electrode ANDE2 may be disposed on the first organic layer 160. The second anode connection electrode ANDE2 may be connected to the second anode connection electrode ANDE2 through a second anode contact hole ANCT2 that penetrates through the first organic layer 160 to expose the first anode connection electrode ANDE1. The second anode connection electrode ANDE2 may be made up of a single layer or multiple layers of one of molybdenum (Mo), aluminum (Al), chromium (Cr), gold (Au), titanium (Ti), nickel (Ni), neodymium (Nd), copper (Cu), and an alloy thereof.

A second organic layer 180 may be disposed on the second anode connection electrode ANDE2. The second organic layer 180 may be formed as an organic layer such as an acryl resin, an epoxy resin, a phenolic resin, a polyamide resin, and a polyimide resin.

In FIG. 10, the thin film transistor ST is implemented as a top-gate transistor in which the gate electrode G is located above the active layer ACT. It is, however, to be understood that the present disclosure is not limited thereto. The thin film transistor ST may be implemented as a bottom-gate transistor in which the gate electrode G is located below the active layer ACT, or as a double-gate transistor in which the gate electrodes G are disposed above and below the active layer ACT.

Light-emitting elements 170 and a bank 190 may be disposed on the second organic layer 180. Each of the light-emitting elements 170 may include a first light emitting electrode 171, an emission layer 172, and a second light emitting electrode 173.

The first light emitting electrode 171 may be formed on the second organic layer 180. The first light emitting electrode 171 may be connected to the second anode connection electrode ANDE2 through a third anode contact hole ANCT3 that penetrates through the second organic layer 180 to expose the second anode connection electrode ANDE2.

In the top-emission organic light-emitting diode that light exits from the emission layer 172 toward the second light emitting electrode 173, the first light emitting electrode 171 may be made of a metal material having a high reflectivity such as a stack structure of aluminum and titanium (Ti/Al/Ti), a stack structure of aluminum and ITO (ITO/Al/ITO), an APC alloy and a stack structure of APC alloy and ITO (ITO/APC/ITO). The APC alloy is an alloy of silver (Ag), palladium (Pd) and copper (Cu).

The bank 190 may partition the first light emitting electrode 171 on the second organic layer 180 to serve to define light-emitting areas EA1, EA2 and EA3. The bank 190 may be formed to cover the edge of the first light emitting electrode 171. The bank 190 may be formed of an organic layer such as an acryl resin, an epoxy resin, a phenolic resin, a polyamide resin, and a polyimide resin.

In each of the light emitting-areas EA1, EA2 and EA3, the first light emitting electrode 171, the emission layer 172 and the second light emitting electrode 173 are stacked on one another sequentially, so that holes from the first light emitting electrode 171 and electrons from the second light emitting electrode 173 are combined with each other in the emission layer 172 to emit light.

In FIG. 10, only the first light-emitting area EA1, the second light-emitting area EA2, and the third light-emitting area EA3 are shown for ease of description. Since the fourth light-emitting area EA4 may be formed similarly to the light-emitting areas EA1, EA2 and EA3 shown in FIG. 10, the description of the first light-emitting area EA1 and the third light-emitting area EA3 will be omitted.

The emission layer 172 is formed on the first light emitting electrode 171 and the bank 190. The emission layer 172 may include an organic material and emit light of a certain color. For example, the emission layer 172 may include a hole transporting layer, an organic material layer, and an electron transporting layer.

The second light emitting electrode 173 is formed on the emission layer 172. The second light emitting electrode 173 may be formed to cover the emission layer 172. The second light emitting electrode 173 may be a common layer formed across the light-emitting areas EA1, EA2 and EA3. A capping layer may be formed on the second light emitting electrode 173.

In the top-emission organic light-emitting diode, the second light-emitting electrode 173 may be formed of a transparent conductive material (TCP) such as ITO and IZO that can transmit light, or a semi-transmissive conductive material such as magnesium (Mg), silver (Ag) and an alloy of magnesium (Mg) and silver (Ag). When the second light emitting electrode 173 is formed of a semi-transmissive conductive material, the light extraction efficiency can be increased by using microcavities.

An encapsulation layer TFE may be disposed on the second light emitting electrode 173. The encapsulation layer TFE may include at least one inorganic layer to prevent permeation of oxygen or moisture into the light-emitting element layer EML. In addition, the encapsulation layer TFE may include at least one organic layer to protect the light-emitting element layer EML from particles such as dust. For example, the encapsulation layer TFE may include a first inorganic layer TFE1, an organic layer TFE2 and a second inorganic layer TFE3.

The first inorganic layer TFE1 may be disposed on the second light emitting electrode 173, the organic layer TFE2 may be disposed on the first inorganic layer TFE1, and the second inorganic layer TFE3 may be disposed on the organic layer TFE2. The first inorganic layer TFE1 and the second inorganic layer TFE3 may be made up of multiple layers in which one or more inorganic layers of a silicon nitride layer, a silicon oxynitride layer, a silicon oxide layer, a titanium oxide layer and an aluminum oxide layer are alternately stacked on one another. The organic layer TFE2 may be formed as an organic layer such as an acryl resin, an epoxy resin, a phenolic resin, a polyamide resin, and a polyimide resin.

Figure 11:
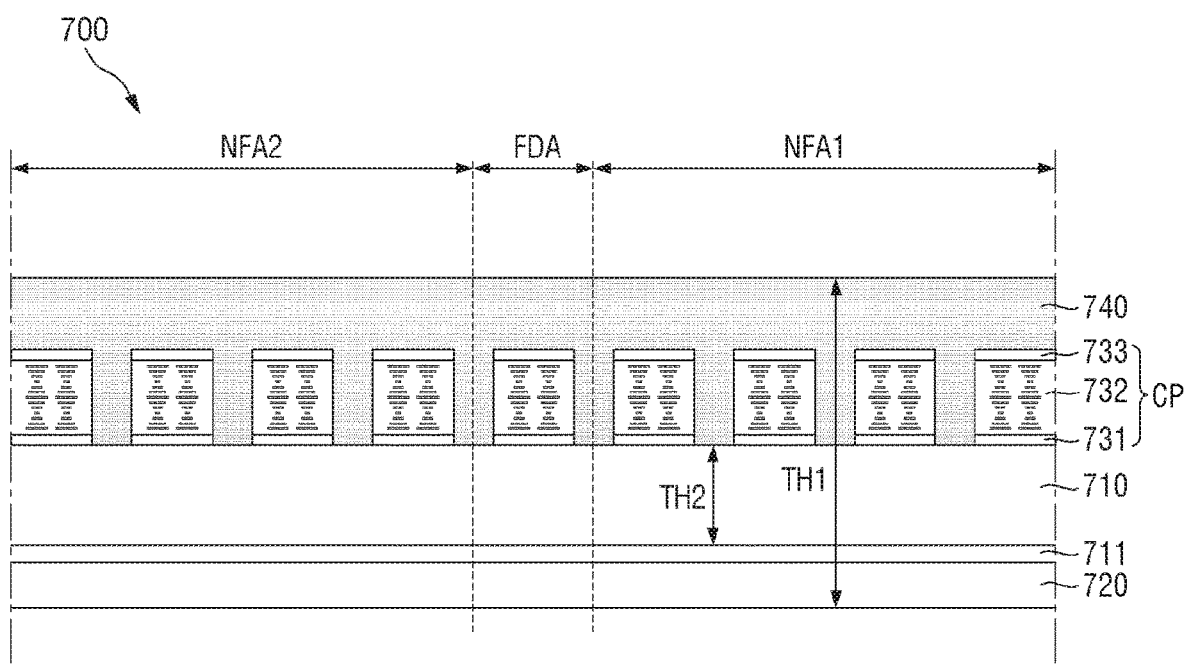
FIG. 11 is a cross-sectional view showing a code pattern layer according to an embodiment of the present disclosure.
Figure 12:
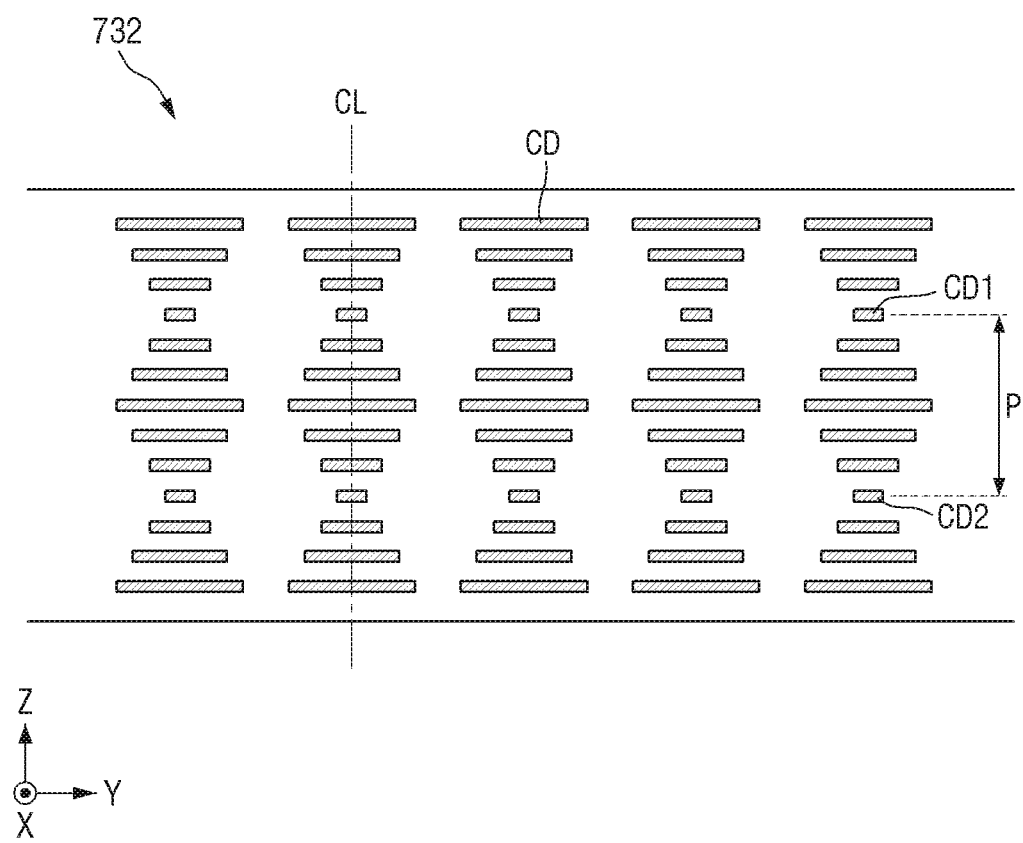
FIG. 12 is cross-sectional view showing a cholesteric liquid crystal according to an embodiment of the present disclosure.
Figure 13:
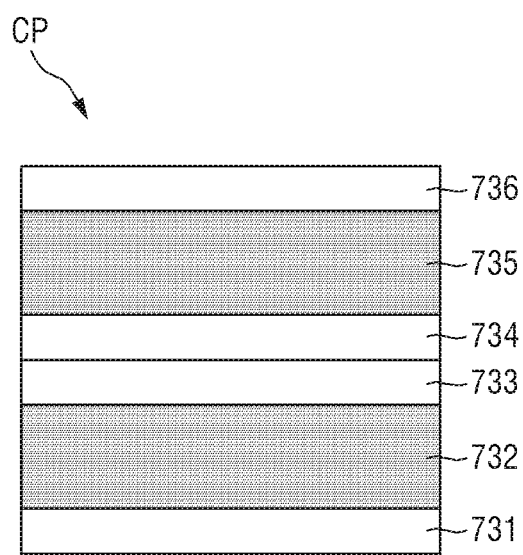
FIG. 13 is cross-sectional view showing a code pattern according to an embodiment of the present disclosure.
Figure 14:
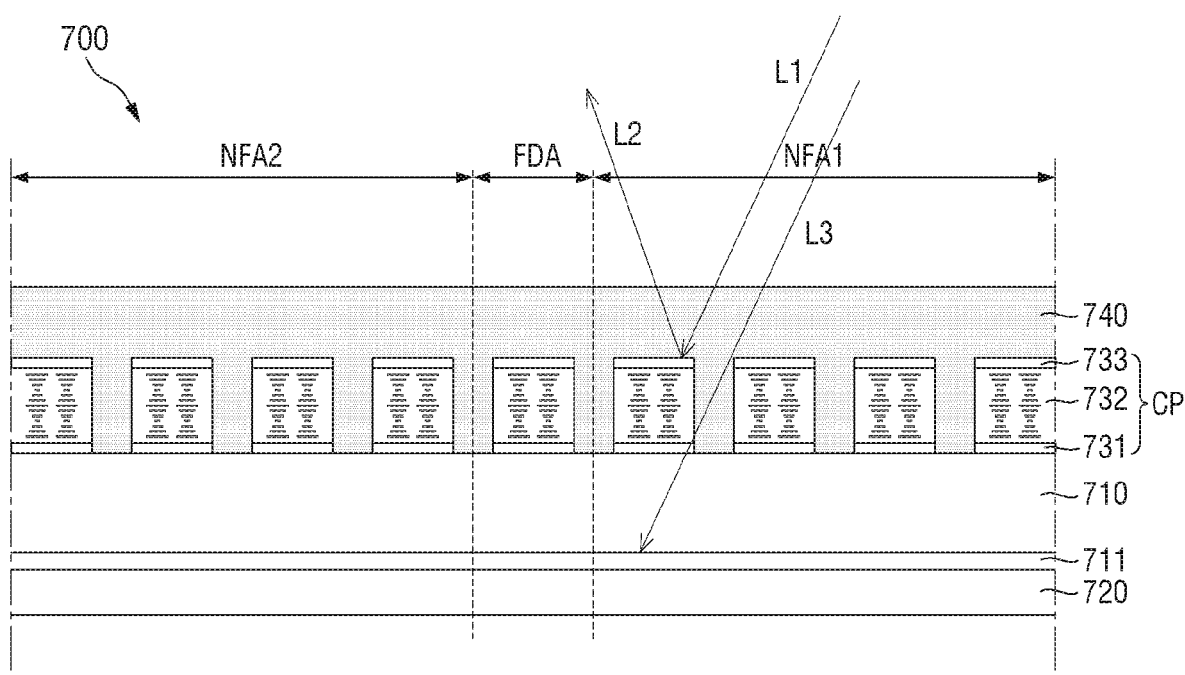
FIG. 14 is cross-sectional view showing light reflected on the code pattern layer according to an embodiment of the present disclosure.

FIG. 11 is a cross-sectional view showing a code pattern layer according to an embodiment of the present disclosure. FIG. 12 is a cross-sectional view of a cholesteric liquid crystal according to an embodiment of the present disclosure. FIG. 13 is a cross-sectional view of a code pattern layer according to an embodiment of the present disclosure. FIG. 14 is a cross-sectional view of light reflected by a code pattern layer according to an embodiment of the present disclosure.

Referring to FIGS. 11 and 12, the code pattern layer 700 includes a light absorption layer 720, an adhesive layer 711, a base layer 710, a code pattern CP, and a UV blocking layer 740.

A first thickness TH1 of the code pattern layer 700 may be 100 μm or less. When the display device 10 is folded, the code pattern layer 700 is subject to folding stress. As the thickness of the code pattern layer 700 increases, folding stress may increase, and thus the code pattern layer 700 may be peeled off. Accordingly, when the first thickness TH1 of the code pattern layer 700 is 100 μm or less, the code pattern layer 700 may not be peeled off even when the display device 10 is folded.

The light absorption layer 720 may absorb light incident from the outside. For example, when infrared light is incident on the light absorption layer 720, the light absorption layer 720 may absorb the infrared light, so that the reflectance of the light may decrease.

The base layer 710 may be disposed on the light absorption layer 720. The base layer 710 may be made of, for example, triacetyl cellulose (TAC), polymethyl methacrylate (PMMA), polyethylene terephthalate (PET), or the like. The light absorption layer 720 may be provided in the form of a film and attached to the base layer 710, or may be directly formed on the base layer 710.

A second thickness TH2 of the base layer 710 may be smaller than the thickness of the second adhesive member AD2. As described above, in order to reduce the folding stress of the code pattern layer 700, when the thickness of the code pattern layer 700 is 100 μm or less, the second thickness TH2 of the base layer 710 may be smaller than the thickness of the second adhesive member AD2. When the second thickness TH2 of the base layer 710 is greater than the thickness of the second adhesive member AD2, the adhesive layer 711 or the code pattern CP may be peeled off by the folding stress as the display device 10 is folded.

The adhesive layer 711 may be disposed between the light absorption layer 720 and the base layer 710. The light absorption layer 720 may be attached to the base layer 710 by the adhesive layer 711. The adhesive layer 711 may be a pressure-sensitive adhesive. The adhesive layer 711 may be flexible and may include an insulating material. In this case, the light absorption layer 720 may be provided in a form of a film and attached to the adhesive layer 711. The thickness of the adhesive layer 711 may be 2 um to 3 um.

The code pattern CP may be disposed on the base layer 710. The code pattern CP includes a cholesteric liquid crystal 732, a first alignment layer 731, and a second alignment layer 733.

The code pattern CP may be a cholesteric liquid layer. That is, the code pattern CP includes chiral dopants inducing a periodic spiral structure in cholesteric liquid crystal 732.

The cholesteric liquid crystal 732 may be a chiral nematic liquid crystal. Optical properties of the code pattern CP may be determined according to a rotation direction of the spiral structure in which the cholesteric liquid crystals 732 are twisted and rotated.

The code pattern CP has a spiral structure in which the chiral dopants (or liquid crystal molecules) of the cholesteric liquid crystals 732 are arranged in a spiral manner along spiral axes. A distance from a first chiral dopant CD1 to a second chiral dopant CD2 rotated by 360° in a spiral axis direction with respect to the first chiral dopant CD1 may be defined as a pitch P of the cholesteric liquid crystals 732. That is, the pitch P may be a distance between the first chiral dopant CD1 and the second chiral dopant CD2 in the third direction Z-axis direction. Alternatively, a spiral axis CL of the cholesteric liquid crystals 732 may extend in the third direction Z-axis direction, and the pitch P may be a distance between the first chiral dopant CD1 and the second chiral dopant CD2 in the third direction Z-axis direction on the spiral axis CL.

Accordingly, the cholesteric liquid crystals 732 arranged in the spiral structure by the chiral dopants CD reflect light of a long wavelength as the pitch P becomes great, and reflect light of a short wavelength as the pitch P becomes small. That is, it is possible to determine which wavelength of light is reflected depending on how the pitch P of the cholesteric liquid crystals 732 arranged in the spiral structure by the chiral dopants CD is designed. The pitch P of the cholesteric liquid crystals 732 arranged in the spiral structure by the chiral dopants may be adjusted according to an amount of the chiral dopants CD.

The code pattern CP transmits only some light polarized in a direction opposite to a rotation direction of a spiral and reflects the other light. A wavelength of the reflected light may be expressed as the product of an average refractive index of the cholesteric liquid crystals 732 and the pitch P.

Even though a liquid crystal composition is prepared in order to align the cholesteric liquid crystals 732 having a desired pitch, a combination of liquid crystal molecules in a liquid crystal molecule group constituting the pitch is randomly determined, and thus, the liquid crystal molecule group is aligned so as to have a pitch in a predetermined range. In addition, since each of the liquid crystal molecules has a refractive index within a predetermined range and the combination of the liquid crystal molecules constituting one pitch is randomly determined, an average refractive index of the liquid crystal molecule group constituting one pitch may be different from that of another pitch.

Accordingly, the code pattern CP has a refractive index in a predetermined range, and is aligned so as to have a pitch in a predetermined range. As a refractive index range of the code pattern CP becomes wide and a pitch range of the code pattern CP becomes wide, the code pattern CP may reflect light of a wide wavelength band. A wavelength band of reflected light of a liquid crystal molecule group constituting one pitch is determined as represented in Equation 1, and a wavelength band of the reflected light reflected from the code pattern CP including a plurality of liquid crystal molecule groups having different pitches is determined as represented in Equation 1.

$$P = \frac{\lambda}{n} \quad \text{Equation 1}$$

Here, P refers to the pitch of the cholesteric liquid crystals 732 arranged in the spiral structure by the chiral dopants, λ refers to a reflection wavelength at which light is reflected, and n refers to the average refractive index of the cholesteric liquid crystals 732. For example, when the reflection wavelength (λ) is 780 nm and the average refractive index (n) of the cholesteric liquid crystals 732 is 1.5, the pitch P of the cholesteric liquid crystals 732 arranged in the spiral structure by the chiral dopants may be calculated to be 520 nm. In addition, when the reflection wavelength (λ) is 380 nm and the average refractive index (n) of the cholesteric liquid crystals 732 is 1.5, the pitch P of the cholesteric liquid crystals 732 arranged in the spiral structure by the chiral dopants may be calculated to be 253 nm. That is, when the refractive index (n) of the cholesteric liquid crystals 732 is 1.5, the pitch P may be designed to be 253 nm or less or 520 nm or more so that the reflection wavelength (λ) of the cholesteric liquid crystals 732 arranged in the spiral structure by the chiral dopants is 380 nm or less and 780 nm or more in order to reflect an infrared wavelength band (wavelength band of 780 nm or more) or an ultraviolet wavelength band (wavelength band of 380 nm or less).

In order to align the cholesteric liquid crystals 732 in a more planar form, the code pattern layer 700 may further include alignment layers 731 and 733. For example, as illustrated in FIG. 11, the code pattern CP may be aligned between a first alignment layer 731 and a second alignment layer 733. The alignment layer may be a polyimide layer, and the cholesteric liquid crystals may be aligned on the rubbed polyimide layer.

The layer-type code pattern CP is oriented on the first alignment layer 731, and the second alignment layer 733 is disposed on the code pattern CP. The liquid crystal composition of the code pattern CP in a liquid state is coated on one surface of the first alignment layer 731, then subjected to primary curing, and the coating layer is thermally cured in an oven at 80° C. for 5 minutes. Thereafter, secondary curing is performed using a UV light source. Accordingly, the chiral dopant in the code pattern CP may be fixed to have a predetermined pitch P and a spiral axis CL.

Referring further to FIG. 13, the code pattern layer 700 may include a plurality of code patterns CP. For example, the code pattern layer 700 may include the cholesteric liquid crystal 732 and a sub-cholesteric liquid crystal 735. In order to align the cholesteric liquid crystal 732, the first alignment layer 731 and the second alignment layer 733 may be disposed on one surface and the other surface of the cholesteric liquid crystal 732, respectively. In addition, in order to align a sub-cholesteric liquid crystal 735, a third alignment layer 734 and a fourth alignment layer 736 may be disposed on one surface and the other surface of the first code pattern CP, respectively. However, the number of cholesteric liquid crystals in the code pattern layer 700 is not limited thereto, and may be freely designed according to the wavelength band of the reflected light.

Referring further to FIG. 14, accordingly, the code pattern layer 700 may selectively reflect light. For example, when an incident light L1 emitted from a position input device 20 is incident on the code pattern CP, a reflected light L2 may be generated by being reflected from the code pattern CP. In this case, the reflected light L2 may have an infrared wavelength according to the refractive index of the cholesteric liquid crystal 732. Also, when the incident light L1 emitted from the position input device 20 is incident on the light absorption layer 720, the light absorption layer 720 may absorb a light L3 and generate reflected light. Accordingly, the position input device 20 may accurately recognize the position of the position input device 20 by the light reflected from the code pattern CP of the display device 10.

The UV blocking layer 740 is disposed on the code pattern CP. The UV blocking layer 740 may include a UV cut function. For example, when UV rays are incident on the UV blocking layer 740 from the outside, the UV blocking layer 740 may block UV light and transmit light of the remaining wavelengths. Accordingly, it is possible to prevent the light absorption layer 720 disposed on the rear surface of the UV blocking layer 740 from being deteriorated by UV rays.

Figure 15:
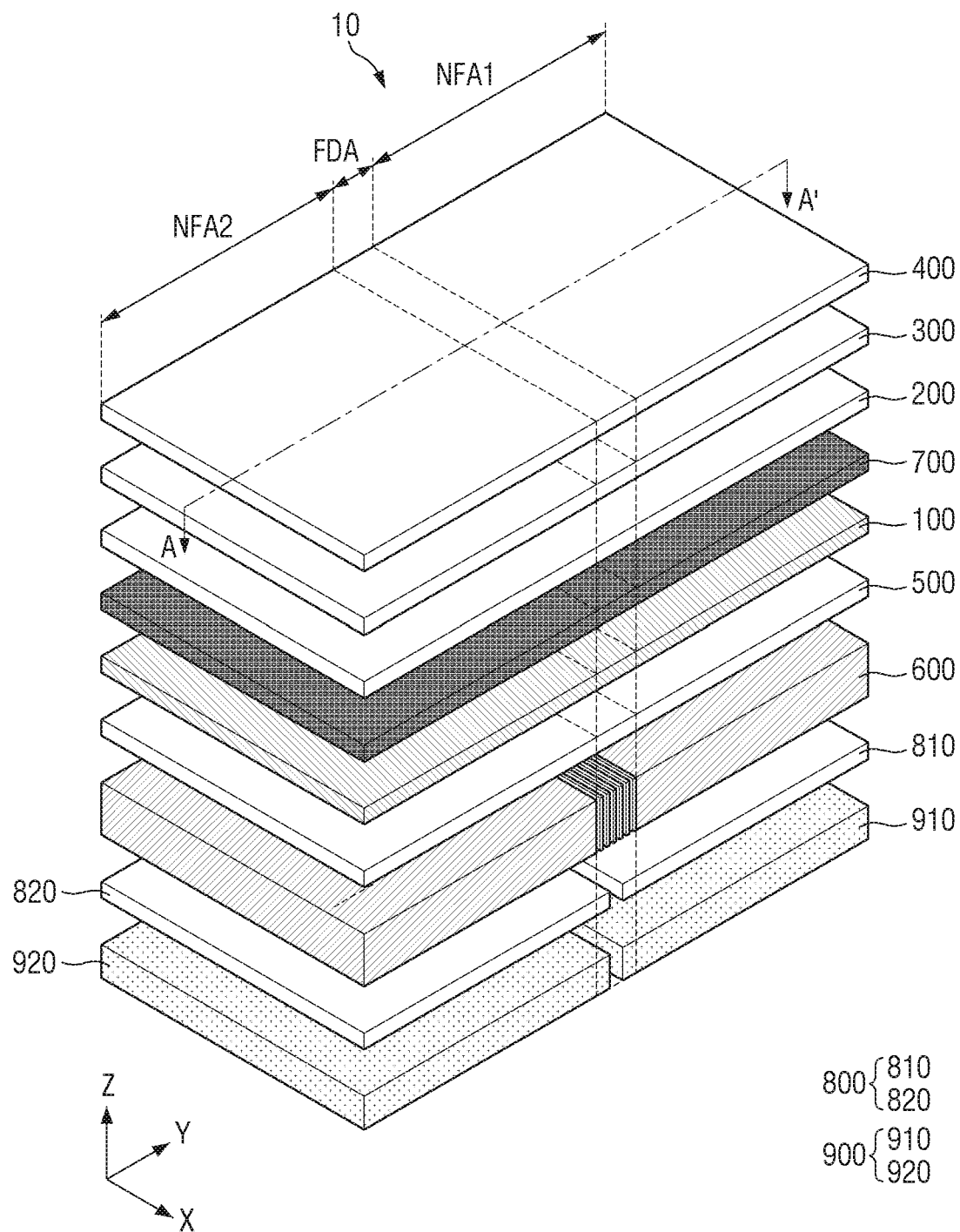
FIG. 15 is an exploded perspective view of a display device according to an embodiment of the present disclosure.
Figure 16:
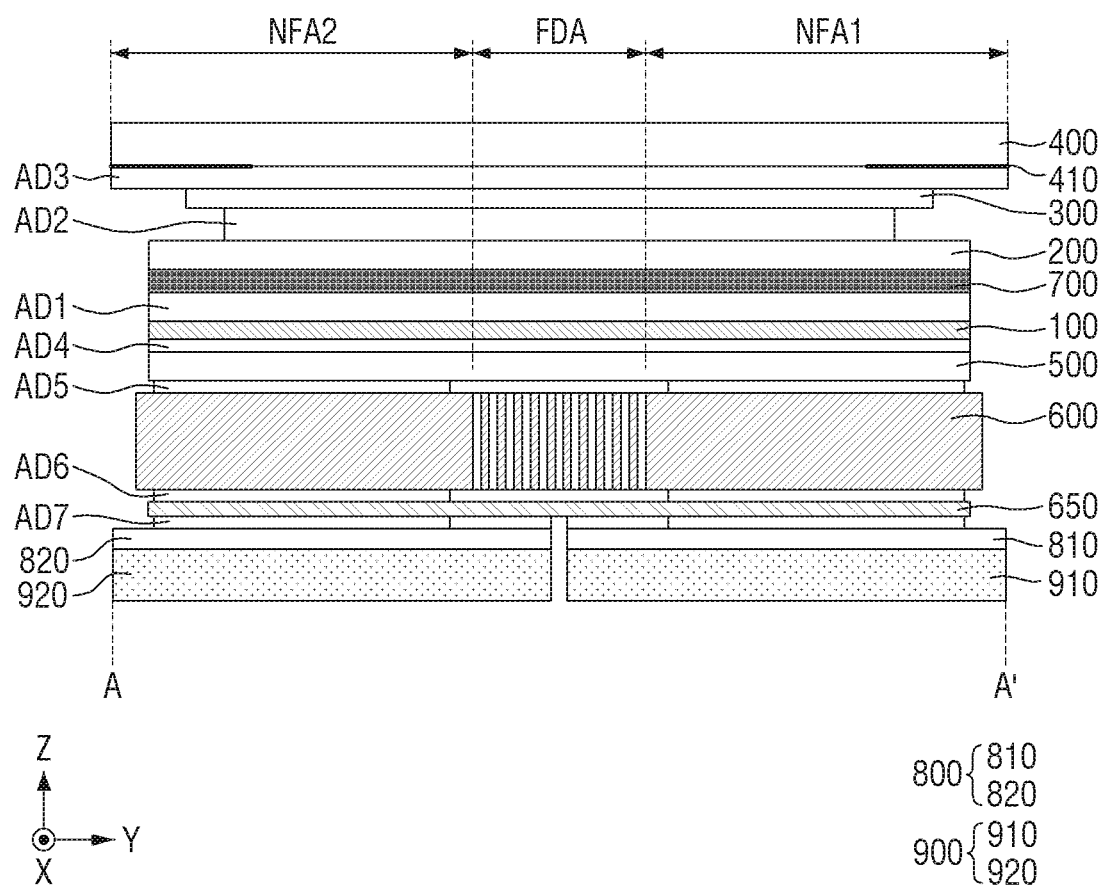
FIG. 16 is a cross-sectional view showing a display device according to an embodiment of the present disclosure.
Figure 17:
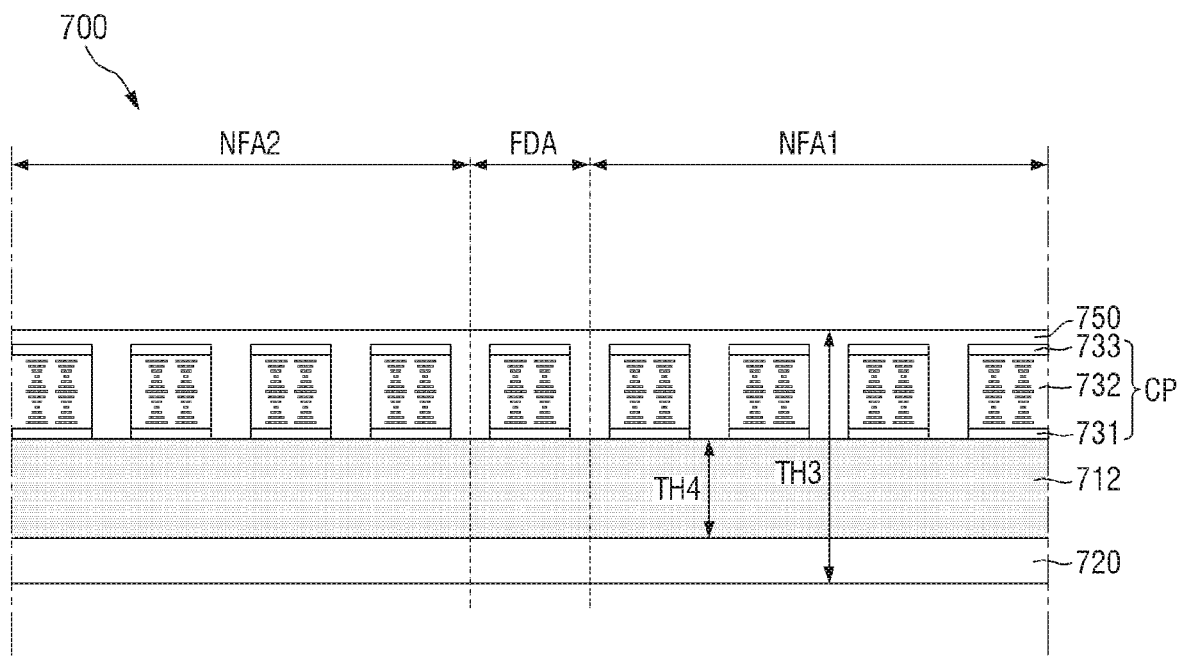
FIGS. 17 and 18 are cross-sectional views of a code pattern layer according to an embodiment of the present disclosure.
Figure 18:
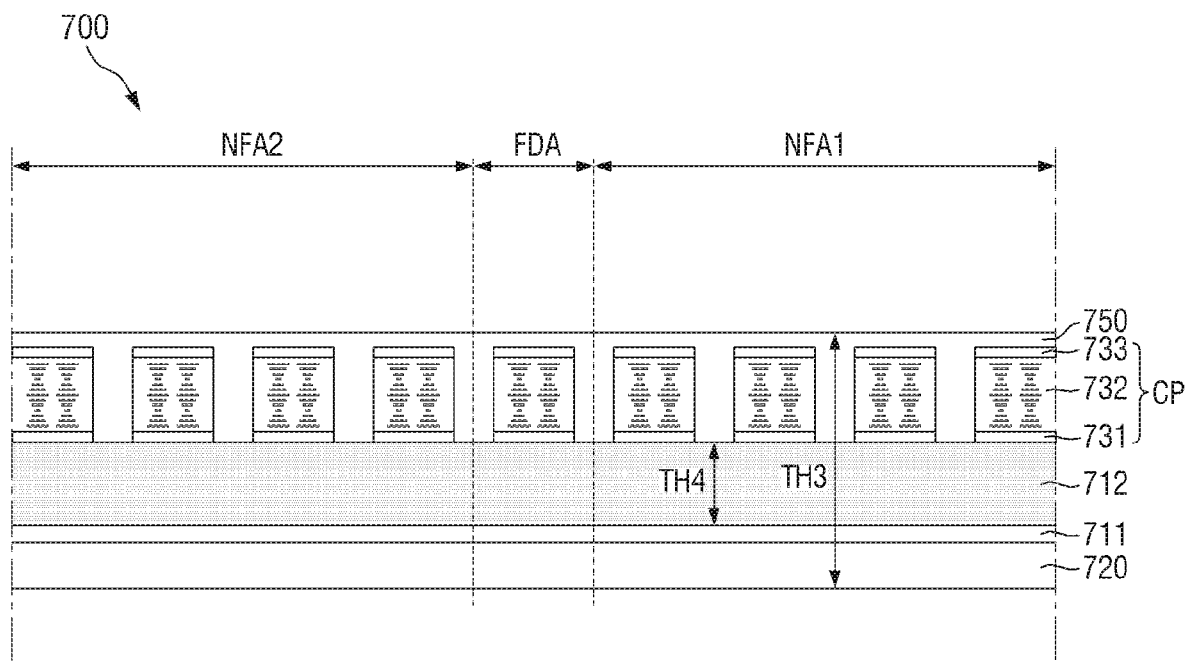

FIG. 15 is an exploded perspective view of a display device according to an embodiment of the present disclosure. FIG. 16 is a cross-sectional view of a display device according to an embodiment of the present disclosure. FIGS. 17 and 18 are cross-sectional views of a code pattern layer according to an embodiment of the present disclosure.

The embodiment of FIGS. 15 to 18 is substantially the same as the embodiment of FIGS. 11 to 14 except that the polarizing layer 200 is disposed on the code pattern layer 700. Hereinafter, the embodiment of FIGS. 15 to 18 will be described focusing on differences from the embodiment of FIGS. 11 to 14.

Referring to FIGS. 15 and 16, the display device 10 according to an embodiment includes the display panel 100, the polarizing layer 200, the code pattern layer 700, the window 300, the protective layer 400, the panel lower member 500, the light blocking member 600, the shielding member 800, and the heat dissipation member 900.

The code pattern layer 700 may be disposed on the front surface of the display panel 100. For example, the code pattern layer 700 may be disposed in the first non-folding area NFA1, the second non-folding area NFA2, and the folding area FDA. A third thickness TH3 of the code pattern layer 700 may be 100 µm or less. When the display device 10 is folded, the code pattern layer 700 is subject to folding stress. As the thickness of the code pattern layer 700 increases, folding stress may increase, and thus the code pattern layer 700 may be peeled off. Accordingly, when the third thickness TH3 of the code pattern layer 700 is 100 µm or less, the code pattern layer 700 may not be peeled off even when the display device 10 is folded.

The code pattern layer 700 may selectively reflect light incident from the outside. For example, the code pattern layer 700 may include a code pattern CP, and the code pattern CP may change the wavelength of light incident from the outside and reflect the light. In addition, in a region in which the code pattern CP is not disposed in the code pattern layer 700, light incident from the outside may be absorbed. Accordingly, the code pattern layer 700 may selectively reflect or absorb light incident from the outside.

Referring further to FIG. 17, the code pattern layer 700 includes the light absorption layer 720, a base layer 712 disposed on the light absorption layer 720, and the code pattern CP disposed on the base layer 712.

The base layer 712 may be disposed on the light absorption layer 720. The base layer 712 may be made of, for example, triacetyl cellulose (TAC), polymethyl methacrylate (PMMA), polyethylene terephthalate (PET), or the like. The light absorption layer 720 may be provided in the form of a film and attached to the base layer 712, or may be directly formed on the base layer 712.

The base layer 712 may include a UV cut function. For example, when UV rays are incident on the base layer 712 from the outside, the base layer 712 may block UV light and transmit light of the remaining wavelengths. Accordingly, it is possible to prevent the light absorption layer 720 disposed on the rear surface of the base layer 712 from being deteriorated by UV rays.

A fourth thickness TH4 of the base layer 712 may be smaller than the thickness of the second adhesive member AD2. As described above, in order to reduce the folding stress of the code pattern layer 700, when the thickness of the code pattern layer 700 is 100 µm or less, the fourth thickness TH4 of the base layer 712 may be smaller than the thickness of the second adhesive member AD2. When the fourth thickness TH4 of the base layer 712 is greater than the thickness of the second adhesive member AD2, the adhesive layer 711 or the code pattern CP may be peeled off by the folding stress as the display device 10 is folded.

Alternatively, as shown in the embodiment of FIG. 18, an adhesive layer 711 may be further disposed between the light absorption layer 720 and the base layer 712. Accordingly, the light absorption layer 720 may be attached to the base layer 712 by the adhesive layer 711. The adhesive layer 711 may be a pressure-sensitive adhesive. The adhesive layer 711 may be flexible and may include an insulating material. In this case, the light absorption layer 720 may be provided in a form of a layer and attached to the adhesive layer 711. The thickness of the adhesive layer 711 may be 2 um to 3 um.

The code pattern CP may be disposed on the base layer 712. The code pattern CP may include a first alignment layer 731, a cholesteric liquid crystal 732, a second alignment layer 733. Descriptions of the first alignment layer 731, the cholesteric liquid crystal 732, and the second alignment layer 733 are substantially the same as in the embodiments of FIGS. 11 to 14, and thus will be omitted.

A blocking layer 750 may be disposed on the code pattern CP. The blocking layer 750 may be a layer for protecting the code pattern CP. Since the base layer 712 performs a UV blocking function, the blocking layer 750 may not perform a UV blocking function.

Referring to FIGS. 15 and 16, the polarizing layer 200 may be disposed on the front surface of a code pattern 700. The polarizing layer 200 may include a linear polarizer and a retardation layer such as a λ/4 (quarter-wave) plate. The description of the polarizing layer 200 is substantially the same as in the embodiment of FIGS. 11 to 14, and thus will be omitted.

The second adhesive member AD2 may be disposed on the polarizing layer 200. The second adhesive member AD2 may be a transparent adhesive film or a transparent adhesive resin. Alternatively, the second adhesive member AD2 may be a pressure-sensitive adhesive. The second adhesive member AD2 may be flexible and may include an insulating material.

The thickness of the second adhesive member AD2 may be smaller than a thickness of the code pattern layer 700. For example, when the display device 10 is folded, in order to reduce the folding stress of the code pattern layer 700, the thickness of the code pattern layer 700 may be equal to 100 µm or less. In addition, the second adhesive member AD2 may be desirable to maintain adhesion to the code pattern layer 700. Accordingly, the second adhesive member AD2 may be smaller than the thickness of the code pattern layer 700.

The window 300 may be disposed on a front surface of the second adhesive member AD2. The window 300 may be attached to the front surface of the code pattern layer 700 through the second adhesive member AD2. The window 200 may be made of a transparent material, and may include, for example, glass or plastic. For example, the window 300 may be, but is not limited to, an ultra thin glass (UTG) having a thickness of 0.1 mm or less or a transparent polyimide film.

Descriptions of the protective layer 400, the panel lower member 500, the light blocking member 600, the shielding member 800, and the heat dissipation member 900 are substantially the same as in the embodiments of FIGS. 11 to 14, and thus will be omitted.

In the case of the display device 10 according to the present embodiment, the code pattern layer 700 may selectively reflect light. For example, when the incident light emitted from a position input device 20 is incident on the code pattern CP, the reflected light L2 may be generated by being reflected from the code pattern CP. In this case, the reflected light L2 may have an infrared wavelength according to the refractive index of the cholesteric liquid crystal 732. Also, when the incident light emitted from the position input device 20 is incident on the light absorption layer 720, the light absorption layer 720 may absorb the incident light and generate reflected light. Accordingly, the position input device 20 may accurately recognize the position of the position input device 20 by the light reflected from the code pattern CP of the display device 10.

In this case, even when the display device 10 is folded, the code pattern layer 700 may be prevented from peeling off by forming the thickness of the code pattern layer 700 to be 100 μm or less.

Figure 19:
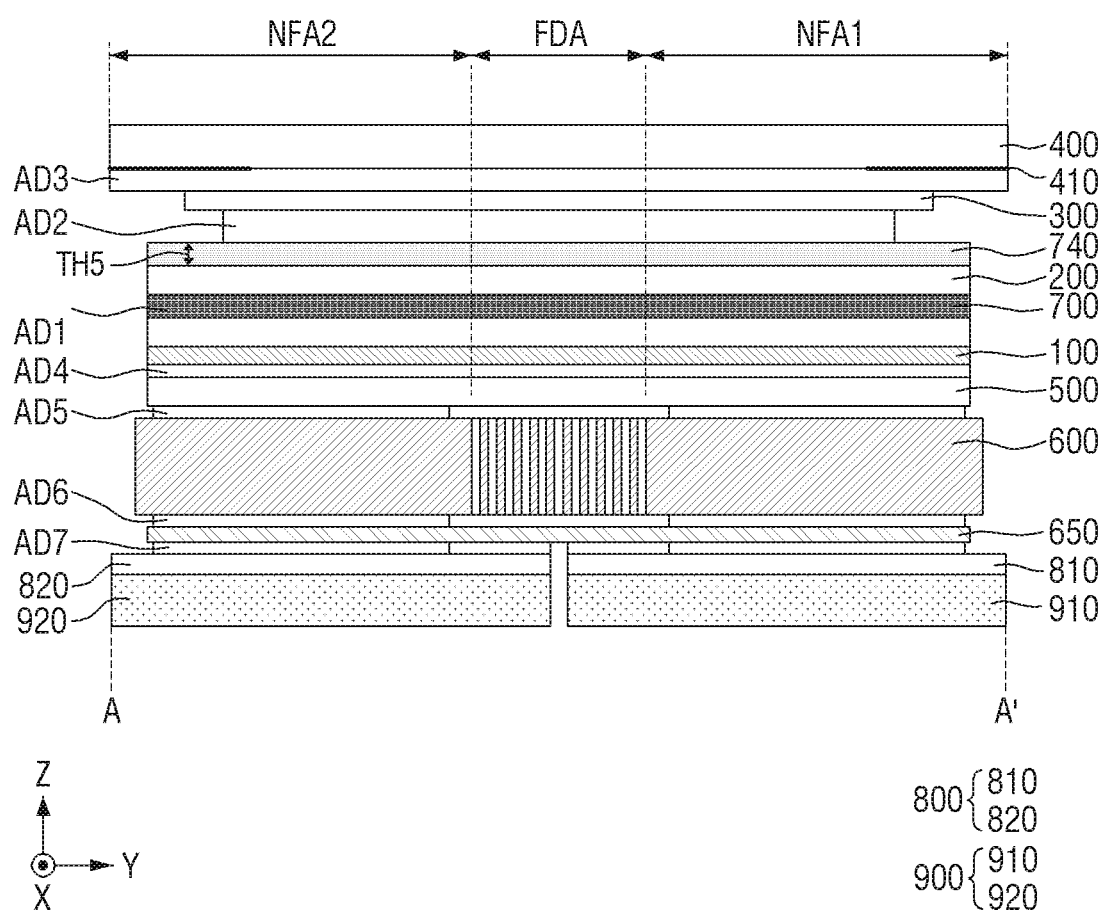
FIG. 19 is a cross-sectional view showing a display device according to an embodiment of the present disclosure.
Figure 20:
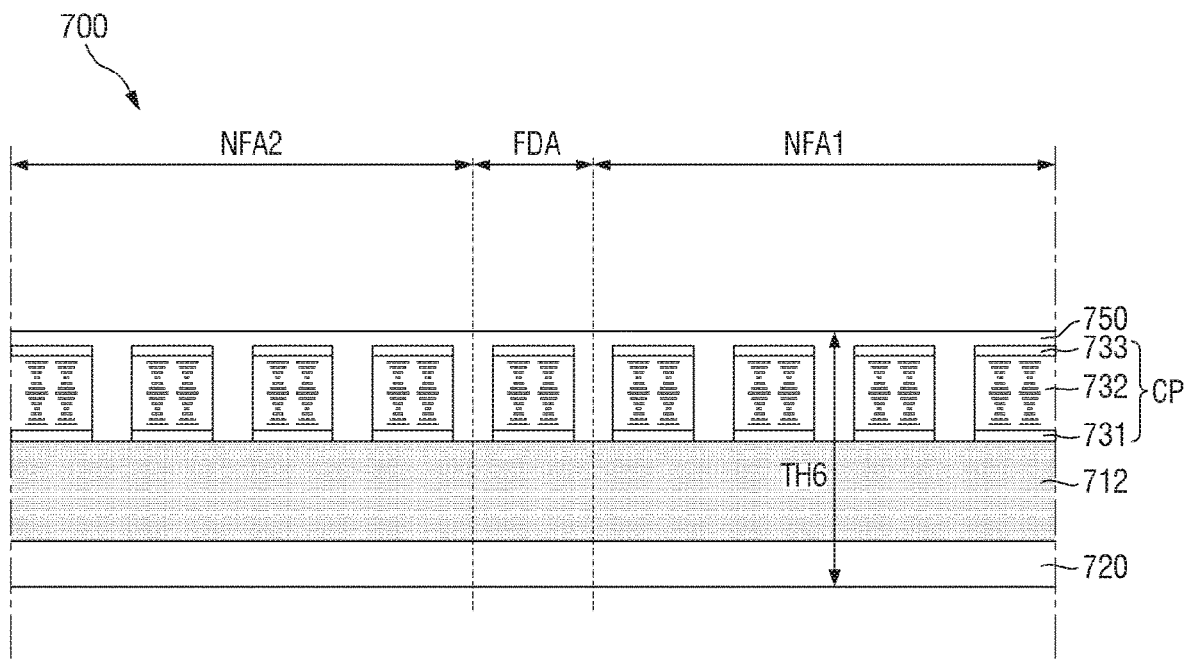
FIGS. 20 and 21 are cross-sectional views of a code pattern layer according to an embodiment of the present disclosure.
Figure 21:
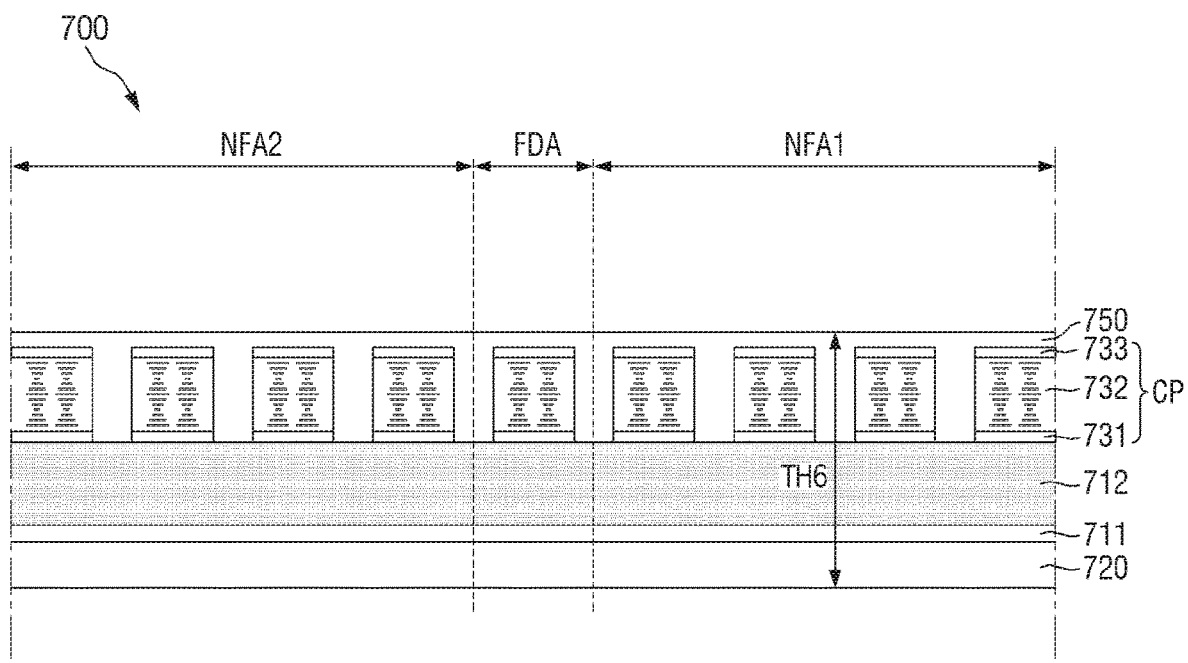

FIG. 19 is a cross-sectional view of a display device according to an embodiment of the present disclosure. FIGS. 20 and 21 are cross-sectional views of a code pattern layer according to an embodiment of the present disclosure.

The embodiment of FIGS. 19 to 21 is substantially the same as the embodiment of FIGS. 11 to 14 except that the UV blocking layer 740 is not included in the code pattern layer 700 and the polarizing layer 200 is separately formed. Hereinafter, the embodiment of FIGS. 19 to 21 will be described mainly focusing on differences from the embodiment of FIGS. 11 to 14.

Referring to FIG. 19, the display device 10 according to an embodiment includes the display panel 100, the polarizing layer 200, the code pattern layer 700, a UV blocking layer 740, the window 300, the protective layer 400, the panel bottom member 500, the light blocking member 600, the shielding member 800, and the heat dissipation member 900.

The code pattern layer 700 may be disposed on the front surface of the display panel 100. For example, the code pattern layer 700 may be disposed in the first non-folding area NFA1, the second non-folding area NFA2, and the folding area FDA. The third thickness TH3 of the code pattern layer 700 may be 100 μm or less. When the display device 10 is folded, the code pattern layer 700 is subject to folding stress. As the thickness of the code pattern layer 700 increases, folding stress may increase, and thus the code pattern layer 700 may be peeled off. Accordingly, when the third thickness TH3 of the code pattern layer 700 is 100 μm or less, the code pattern layer 700 may not be peeled off even when the display device 10 is folded.

The code pattern layer 700 may selectively reflect light incident from the outside. For example, the code pattern layer 700 may include a code pattern CP, and the code pattern CP may change the wavelength of light incident from the outside and reflect the light. In addition, in a region in which the code pattern CP is not disposed in the code pattern layer 700, light incident from the outside may be absorbed. Accordingly, the code pattern layer 700 may selectively reflect or absorb light incident from the outside.

Referring further to FIG. 20, the code pattern layer 700 includes the light absorption layer 720, the base layer 712 disposed on the light absorption layer 720, and the code pattern CP disposed on the base layer 712)

The base layer 712 may be disposed on the light absorption layer 720. The base layer 712 may be made of, for example, triacetyl cellulose (TAC), polymethyl methacrylate (PMMA), polyethylene terephthalate (PET), or the like. The light absorption layer 720 may be provided in the form of a film and attached to the base layer 712, or may be directly formed on the base layer 712.

A sixth thickness TH6 of the base layer 712 may be smaller than the thickness of the second adhesive member AD2. As described above, in order to reduce the folding stress of the code pattern layer 700, when the thickness of the code pattern layer 700 is 100 μm or less, the sixth thickness TH6 of the base layer 712 may be smaller than the thickness of the second adhesive member AD2. When the sixth thickness TH6 of the base layer 712 is greater than the thickness of the second adhesive member AD2, the adhesive layer 711 or the code pattern CP may be peeled off by the folding stress as the display device 10 is folded.

Alternatively, as shown in the embodiment of FIG. 21, the adhesive layer 711 may be further disposed between the light absorption layer 720 and the base layer 712. Accordingly, the light absorption layer 720 may be attached to the base layer 712 by the adhesive layer 711. The adhesive layer 711 may be a pressure-sensitive adhesive. The adhesive layer 711 may be flexible and may include an insulating material. In this case, the light absorption layer 720 may be provided in a form of a film and attached to the adhesive layer 711. The thickness of the adhesive layer 711 may be 2 um to 3 um.

The code pattern CP may be disposed on the base layer 712. The code pattern CP may include a first alignment layer 731, a cholesteric liquid crystal 732, and a second alignment layer 733. Descriptions of the first alignment layer 731, the cholesteric liquid crystal 732, and the second alignment layer 733 are substantially the same as in the embodiments of FIGS. 11 to 14, and thus will be omitted.

The blocking layer 750 may be disposed on the code pattern CP. The blocking layer 750 may be a layer for protecting the code pattern CP.

Referring back to FIG. 19, the polarizing layer 200 may include a linear polarizer and a retardation layer such as a λ/4 (quarter-wave) plate. The polarizing layer 200 may include a linear polarizer and a retardation layer such as a λ/4 (quarter-wave) plate. The description of the polarizing layer 200 is substantially the same as in the embodiment of FIGS. 11 to 14, and thus will be omitted.

The UV blocking layer 740 may be disposed on the polarizing layer 200. The UV blocking layer 740 may include a UV cut function. For example, when UV rays are incident on the UV blocking layer 740 from the outside, the UV blocking layer 740 may block UV light and transmit light of the remaining wavelengths. Accordingly, it is possible to prevent the light absorption layer 720 disposed on the rear surface of the UV blocking layer 740 from being deteriorated by UV rays.

In this case, a fifth thickness TH5 of the UV blocking layer 740 may be 100 μm or less. When the display device 10 is folded, the UV blocking layer 740 is subject to folding stress. As the thickness of the UV blocking layer 740 increases, folding stress may increase, and thus the UV blocking layer 740 may be peeled off. Accordingly, when the fifth thickness TH5 of the UV blocking layer 740 is 100 μm or less, the UV blocking layer 740 may not be peeled off even when the display device 10 is folded.

The second adhesive member AD2 may be disposed on the UV blocking layer 740. The second adhesive member AD2 may be a transparent adhesive layer or a transparent adhesive resin. Alternatively, the second adhesive member AD2 may be a pressure-sensitive adhesive. The second adhesive member AD2 may be flexible and may include an insulating material.

The description of the window 300, the protective layer 400, the panel bottom member 500, the light blocking member 600, the shielding member 800, and the heat dissipation member 900 is substantially the same as the embodiment of FIGS. 11 to 14, and thus will be omitted.

In the case of the display device 10 according to the present embodiment, the code pattern layer 700 may selectively reflect light. For example, when the incident light emitted from a position input device 20 is incident on the code pattern CP, the reflected light may be generated by being reflected from the code pattern CP. In this case, the reflected light may have an infrared wavelength according to the refractive index of the cholesteric liquid crystal 732. Also, when the incident light emitted from the position input device 20 is incident on the light absorption layer 720, the light absorption layer 720 may absorb the incident light and generate reflected light. Accordingly, the position input device 20 may accurately recognize the position of the position input device 20 by the light reflected from the code pattern CP of the display device 10.

In this case, even when the display device 10 is folded, the code pattern layer 700 and the UV blocking layer 740 may be prevented from peeling off by forming each of the thicknesses of the code pattern layer 700 and the UV blocking layer 740 to be 100 μm or less.

Figure 22:
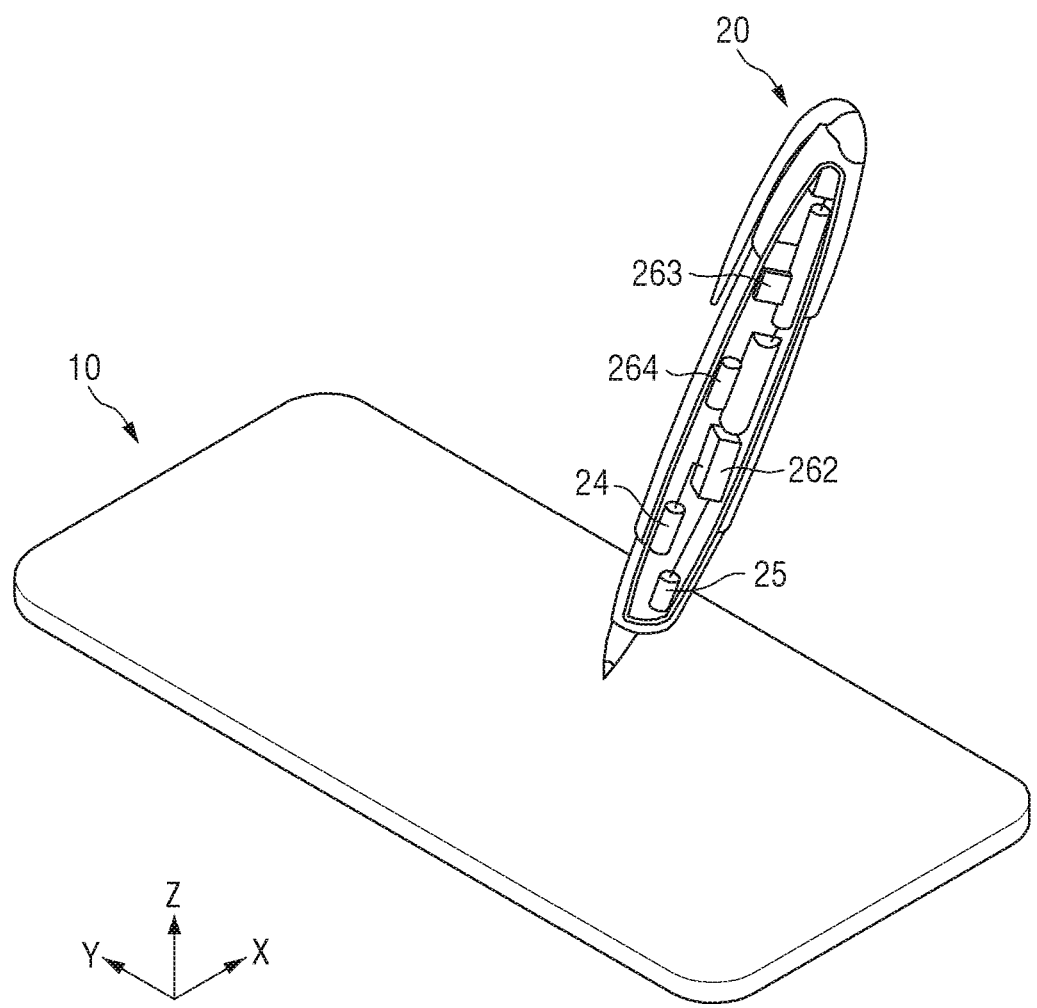
FIG. 22 is a configuration view illustrating a position input device and a display device according to an embodiment of the present disclosure.
Figure 23:
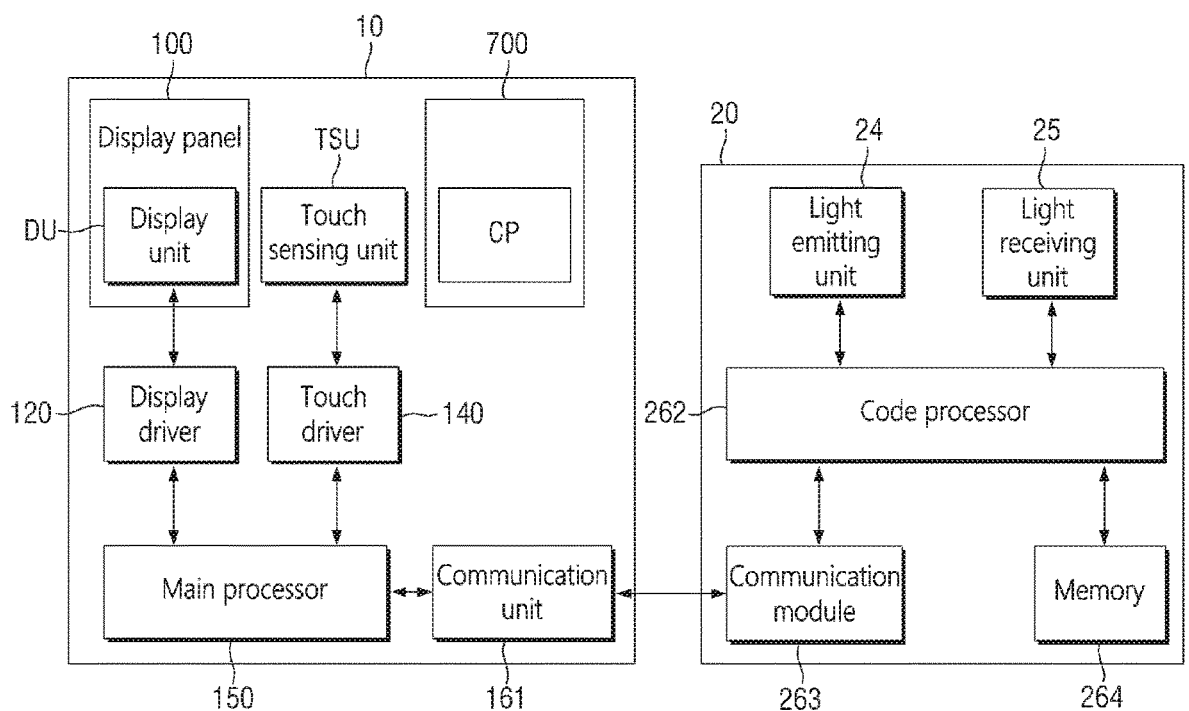
FIG. 23 is a block diagram illustrating the position input device and the display device according to an embodiment of the present disclosure.

FIG. 22 is a schematic view showing a position input device and a display device according to an embodiment of the present disclosure. FIG. 23 is a block diagram illustrating a position input device and a display device according to an embodiment of the present disclosure.

Referring to FIGS. 22 and 23, the display device 10 according to an embodiment includes the display panel 100, a display driver 120, the code pattern layer 700, a touch driver 140, a main processor 150, and a communication unit 161.

The display device 10 uses the position input device 20 as a touch input mechanism. The position input device 20 is an electronic pen that detects display light of the display panel 100 or light reflected from the display panel 100 using an optical method, and may detect the code pattern included in the display panel 100 based on the sensed light and generate coordinate data.

The display panel 100 may include a display unit DU that displays an image. The display unit DU may include a plurality of pixels and display an image through the plurality of pixels.

The display device 10 may include a body part such as a finger and a touch sensing unit TSU for sensing the position input device 20. The touch sensing unit TSU may include a plurality of touch electrodes to detect a user's touch in a capacitive manner.

The code pattern layer 700 may include code patterns CP cut according to a specific criterion to form a specific code for position information. The code patterns CP may correspond to a value of a preset data code. Accordingly, the position of the position input device 20 may be recognized by detecting the light reflected by the code patterns CP from the position input device 20.

The display driver 120 may output signals and voltages for driving the display unit DU. The display driver 120 may supply data voltages to data lines. The display driver 120 may supply a source voltage to a power line and supply gate control signals to the gate driver.

The touch driver 140 may be connected to the touch sensing unit TSU. The touch driver 140 may supply touch driving signals to the plurality of touch electrodes of the touch sensing unit TSU and sense change amounts in capacitance between the plurality of touch electrodes. The touch driver 140 may determine whether or not a user's touch input has been performed and calculate touch coordinates, based on the change amounts in capacitance between the plurality of touch electrodes.

The main processor 150 may control all functions of the display device 10. For example, the main processor 150 may supply digital video data to the display driver 120 so that the display panel 100 displays the image. For example, the main processor 150 may receive touch data from the touch driver 140 to decide user's touch coordinates, and then generate digital video data according to the user's touch coordinates or execute an application indicated by an icon displayed on the user's touch coordinates. For another example, the main processor 150 receives coordinate data from the position input device 20, determines the touch coordinates of the position input device 20, and then generates digital video data according to the touch coordinates or executes an application indicated by an icon displayed on the touch coordinates of the position input device 20.

The communication unit 161 may perform wired/wireless communication with an external device. For example, the communication unit 161 may transmit and receive communication signals to and from a communication module 263 of the position input device 20. The communication unit 161 may receive the position coordinate data consisting of data codes from the position input device 20, and may provide the position coordinate data to the main processor 150.

The position input device 20 (particularly, a body part and a nib part of the position input device 20) according to an embodiment may be formed in the shape of a writing instrument such as a fountain pen, but is not limited thereto. That is, the position input device 20 may not be limited only to the shape or structure of a writing instrument.

The position input device 20 includes a light emitting unit 24, a light receiving unit 25, and a control unit 26.

The light emitting unit 24 may be disposed at a position adjacent to the pen tip of the position input device 20. The light emitting unit 24 may emit light in one direction. For example, the light emitting unit 24 may emit infrared light from one end of the position input device 20 using at least one infrared light source. At least one infrared light source module included in the light emitting unit 24 may be configured as an infrared LED array having a matrix structure.

The light receiving unit 25 is disposed adjacent to the pen tip of the position input device 20 to detect an image signal related to the code pattern CP included in the display device 10 of the display device 10. Specifically, the light receiving unit 25 may detect infrared light reflected from the code pattern CP with an infrared camera.

The light receiving unit 25 may recognize an infrared image by focusing the infrared light with a lens system. The light receiving unit 25 may convert the formed optical image into an electrical image signal and output the electrical image signal.

The light receiving unit 25 is configured as an array in a matrix pattern like the infrared LED array, and may provide image data of the code patterns to a code processor 262 according to the infrared shape reflected from the code patterns. In this manner, the light receiving unit 25 of the position input device 20 continuously detects code patterns CP included in some regions of the code pattern layer 700 according to the user's control and motion, and may continuously generate the shape data of the code patterns to provide the shape data to the code processor 262.

A light transmitting layer may be further disposed on one side of the light receiving unit 25 and the light emitting unit 24. The light transmitting layer may block wavelength bands other than infrared rays and allow infrared rays to pass therethrough.

The control unit 26 includes the code processor 262, a communication module 263, and a memory 264.

The code processor 262 may determine a time point at which a detection signal is input as a time point at which the position input device 20 is used. When a detection signal is input, the code processor 262 may continuously receive image data of the code pattern CP from the light receiving unit 25. For example, the code processor 262 may continuously receive image data for the code patterns CP included in the code pattern layer 700 and identify the structure and shape of the code patterns CP. The code processor 262 may extract or generate data codes corresponding to the structures and shapes of the code patterns CP, and may extract or generate coordinate data corresponding to the combined data codes by combining the data codes. The code processor 262 may transmit the generated coordinate data to the display device 10 through the communication module 263. In particular, the code processor 262 receives the image data of the code patterns CP and generates and converts data codes corresponding to the code patterns CP, respectively, so that coordinate data can be quickly generated without complicated calculation and correction.

The communication module 263 may conduct wired/wireless communications with an external device. For example, the communication module 263 may transmit/receive communication signals to/from the communication unit 161 of the display device 10. The communication module 263 may receive coordinate data composed of data codes from the code processor 262 and may provide the coordinate data to the communication unit 161.

The memory 264 may store data necessary for driving the position input device 20. The memory 264 stores image data of the code patterns and data codes respectively corresponding to the image data and the code patterns CP. In addition, the memory 264 stores data codes and coordinate data according to the combination of data codes. The memory 264 shares with the code processor 262 the data codes corresponding to respective image data and code patterns CP, and coordinate data according to the combination of data codes. Accordingly, the code processor 262 may combine the data codes through the data codes and the coordinate data stored in the memory 264, and may extract or generate coordinate data corresponding to the combined data codes.

In concluding the detailed description, those skilled in the art will appreciate that many variations and modifications can be made to the embodiments without substantially departing from the principles of the present invention. Therefore, the disclosed embodiments of the invention are used in a generic and descriptive sense only and not for purposes of limitation.

What is claimed:

1. A display device comprising:
    a display panel including a plurality of pixels, a folding area, a first non-folding area disposed on one side of the folding area, and a second non-folding area disposed on the other side of the folding area;
    a first adhesive layer disposed on one surface of the display panel; and
    a code pattern layer including:
        a light absorption layer disposed on one surface of the first adhesive layer;
        a base layer disposed on the light absorption layer; and
        a plurality of code patterns disposed on the base layer,
    wherein a thickness of the base layer is smaller than a thickness of the first adhesive layer.

2. The display device of claim 1,
    wherein the code pattern layer further comprises a UV blocking layer covering the plurality of code patterns.

3. The display device of claim 2,
    wherein a thickness of the code pattern layer is 100 um or less.

4. The display device of claim 1, further comprising a polarizing layer disposed between the first adhesive layer and the light absorption layer.

5. The display device of claim 1, further comprising a polarizing layer disposed on the code pattern layer; and a UV light blocking layer disposed on the polarizing layer.

6. The display device of claim 5,
    wherein the thickness of the first adhesive layer is smaller than the thickness of the UV light blocking layer.

7. The display device of claim 5,
    wherein the thickness of the UV light blocking layer is 100 um or less.

8. The display device of claim 1,
    wherein the code pattern layer further comprises a second adhesive layer disposed between the light absorption layer and the base layer, and
    wherein a thickness of the second adhesive layer is selected from a range of 2 um to 3 um.

9. The display device of claim 1,
    wherein each of the plurality of code patterns comprises:
        a first alignment layer,
        a second alignment layer disposed on the first alignment layer, and
        a liquid crystal layer disposed between the first alignment layer and the second alignment layer and including a cholesteric crystal liquid.

10. The display device of claim 9,
    wherein liquid crystal molecules of the cholesteric crystal liquid are arranged spirally along a thickness direction of the liquid crystal layer.

11. The display device of claim 10,
    wherein each code pattern of the plurality of code patterns reflects infrared light, and
    wherein the light absorption layer absorbs infrared light.

12. The display device of claim 1,
    wherein the light absorption layer contacts the base layer.

13. The display device of claim 1,
    wherein the plurality of code patterns are disposed in the folding area, the first non-folding area, and the second non-folding area.

14. The display device of claim 13,
    wherein each code pattern of the plurality of code patterns does not overlap the plurality of pixels.

15. A display device comprising:
    a display panel including a plurality of pixels, a folding area, a first non-folding area disposed on one side of the folding area, and a second non-folding area disposed on the other side of the folding area;
    a first adhesive layer disposed on one surface of the display panel;

a polarizing layer disposed on the first adhesive layer; and
a code pattern layer including:
- a light absorption layer disposed on the polarizing layer;
- a base layer disposed on the light absorption layer; and
- a plurality of code patterns disposed on the base layer, wherein a thickness of the code pattern layer is smaller than a sum of a thickness of the polarizing layer and a thickness of the first adhesive layer.

16. The display device of claim 15,
wherein a thickness of the base layer is smaller than the thickness of the first adhesive layer.

17. The display device of claim 15,
wherein the thickness of the code pattern layer is 100 um or less.

18. The display device of claim 17,
wherein the code pattern layer further comprises a UV blocking layer covering the plurality of code patterns.

19. The display device of claim 18,
wherein the light absorption layer contacts the base layer.

20. The display device of claim 18,
wherein the plurality of code patterns are disposed in the folding area, the first non-folding area, and the second non-folding area.

\* \* \* \* \*